US012345962B2

(12) United States Patent
Webber et al.

(10) Patent No.: US 12,345,962 B2
(45) Date of Patent: Jul. 1, 2025

(54) METHODS OF INCREASED CONTACT LENS ROTATION

(71) Applicant: CooperVision International Limited, Fareham (GB)

(72) Inventors: Martin Webber, Southampton (GB); Arthur Bradley, Bloomington, IN (US); Paul Chamberlain, Livermore, CA (US); Baskar Arumugam, Dublin, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 676 days.

(21) Appl. No.: 17/730,236

(22) Filed: Apr. 27, 2022

(65) Prior Publication Data

US 2022/0350165 A1 Nov. 3, 2022

Related U.S. Application Data

(60) Provisional application No. 63/181,246, filed on Apr. 29, 2021.

(51) Int. Cl.
*G02C 7/04* (2006.01)
(52) U.S. Cl.
CPC ......... *G02C 7/044* (2013.01); *G02C 2202/24* (2013.01)
(58) Field of Classification Search
CPC .... G02C 7/044; G02C 2202/24; G02C 7/048; G02C 7/045; G02C 7/049; G02C 2202/04;

(Continued)

(56) References Cited

U.S. PATENT DOCUMENTS

2007/0258143 A1 11/2007 Portney
2014/0211147 A1 7/2014 Wei et al.
(Continued)

FOREIGN PATENT DOCUMENTS

CN 101495908 B 12/2010
CN 105204182 B 5/2019
(Continued)

OTHER PUBLICATIONS

Office Action issued in corresponding Taiwan Patent Application No. 111115947 issued May 8, 2023 (22 pages).
(Continued)

*Primary Examiner* — James C. Jones
(74) *Attorney, Agent, or Firm* — Kilyk & Bowersox, P.L.L.C.

(57) ABSTRACT

A contact lens for use in preventing or slowing the development or progression of myopia, and methods of manufacturing and using such a lens. The optic zone of the lens comprises a central region having a curvature providing a base power. The optic zone comprises an annular region circumferentially surrounding the central region. The annular region comprises a treatment zone having a characteristic that reduces the contrast of an image of an object that is formed by light passing through the central region and the treatment zone compared to an image of an object that would be formed by light passing through only the central region. The characteristic that causes the contrast reduction varies with meridian around the annular region. A peripheral zone surrounding the annular region has a constant thickness profile in every meridian or a variation in thickness configured to promote rotation of the lens.

23 Claims, 15 Drawing Sheets

(58) Field of Classification Search
CPC ........ B29D 11/00019; B29D 11/00038; G02B 1/043
See application file for complete search history.

(56) References Cited

U.S. PATENT DOCUMENTS

| | | | |
|---|---|---|---|
| 2014/0347622 A1* | 11/2014 | Wu | G02C 7/044 |
| | | | 351/159.13 |
| 2015/0146160 A1 | 5/2015 | Jubin et al. | |
| 2015/0219926 A1 | 8/2015 | Fujikado et al. | |
| 2015/0362746 A1 | 12/2015 | Skudder | |
| 2017/0010477 A1 | 1/2017 | Verburg et al. | |
| 2017/0184875 A1 | 6/2017 | Newman | |
| 2019/0227342 A1 | 7/2019 | Brennan et al. | |
| 2019/0235279 A1 | 8/2019 | Hones et al. | |
| 2020/0166777 A1 | 5/2020 | Rafaeli et al. | |
| 2021/0055573 A1 | 2/2021 | Back et al. | |

FOREIGN PATENT DOCUMENTS

| | | |
|---|---|---|
| JP | 2014149527 A | 8/2014 |
| JP | 2017510851 A | 4/2017 |
| KR | 20200018426 A | 2/2020 |
| TW | 571142 B | 1/2004 |
| TW | 201940135 A | 10/2019 |
| WO | 2014050879 A1 | 4/2014 |
| WO | 2018208724 A1 | 11/2018 |
| WO | 2021056058 A1 | 4/2021 |
| WO | 2021056059 A1 | 4/2021 |
| WO | 2021159169 A1 | 8/2021 |
| WO | 2021260642 A1 | 12/2021 |

OTHER PUBLICATIONS

Second Written Opinion issued in corresponding International Patent Application No. PCT/GB2022/051021 mailed Mar. 15, 2023 (7 pages).
Response to Second Written Opinion filed May 15, 2023 in corresponding International Patent Application No. PCT/GB2022/051021 (17 pages).
Search and Examination Report issued in corresponding United Kingdom Patent Application No. GB2205856.4 mailed Oct. 21, 2022 (8 pages).
International Search Report and Written Opinion issued in corresponding International Patent Application No. PCT/GB2022/051021 mailed Jul. 15, 2022 (16 pages).
International Preliminary Report on Patentability issued in corresponding International Patent Application No. PCT/GB2022/051021 mailed Jul. 25, 2023 (19 pages).
Office Action issued in corresponding Japanese Patent Application No. 2023-565991 mailed Oct. 3, 2024 (10 pages).

* cited by examiner

METHODS OF INCREASED CONTACT LENS ROTATION

This application claims the benefit under 35 U.S.C. § 119(e) of prior U.S. Provisional Patent Application No. 63/181,246, filed Apr. 29, 2021, which is incorporated in its entirety by reference herein.

The present disclosure concerns contact lenses for use in preventing or slowing the development or progression of myopia by increasing contact lens rotation. The present disclosure also concerns methods of manufacturing such lenses and methods of using such lenses.

BACKGROUND

Myopia (short-sightedness) affects a significant number of people including children and adults. Myopic eyes focus incoming light from distant objects to a location in front of the retina. Consequently, the light converges towards a plane in front of the retina and diverges towards, and is out of focus upon arrival at, the retina. Conventional lenses (e.g. spectacle lenses and contact lenses) for correcting myopia reduce the convergence (for contact lenses), or cause divergence (for spectacle lenses) of incoming light from distant objects before it reaches the eye, so that the location of the focus is shifted onto the retina.

It was suggested several decades ago that progression of myopia in children or young people could be slowed or prevented by under-correcting, i.e. moving the focus towards but not quite onto the retina. However, that approach necessarily results in degraded distance vision compared with the vision obtained with a lens that fully corrects for myopia. Moreover, it is now regarded as doubtful that under-correction is effective in controlling developing myopia. A more recent approach is to provide lenses having both regions that provide full correction of distance vision and regions that under-correct, or deliberately induce, myopic defocus. Lenses may also be provided that increase scattering of light in certain regions of, compared to light passing through the fully correcting region of the lens. It has been suggested that these approaches can prevent or slow down the development or progression of myopia in children or young people, whilst providing good distance vision.

In the case of lenses having a region that provide defocus, the regions that provide full-correction of distance vision are usually referred to as base power regions and the regions that provide under-correction or deliberately induce myopic defocus are usually referred to as add power regions or myopic defocus regions (because the dioptric power is more positive, or less negative, than the power of the distance regions). A surface (typically the anterior surface) of the add power region(s) has a smaller radius of curvature than that of the distance power region(s) and therefore provides a more positive or less negative power to the eye. The add power region(s) are designed to focus incoming parallel light (i.e. light from a distance) within the eye in front of the retina (i.e. closer to the lens), whilst the distance power region(s) are designed to focus light and form an image at the retina (i.e. further away from the lens).

In the case of lenses that increase scattering of light in a certain region, features that increase scattering may be introduced into a lens surface or may be introduced into the material that is used to form the lens. For example scattering elements may be burned into the lens.

A known type of contact lens that reduces the progression of myopia is a dual-focus contact lens, available under the name of MISIGHT (CooperVision, Inc.). This dual-focus lens is different than bifocal or multifocal contact lenses configured to improve the vision of presbyopes, in that the dual-focus lens is configured with certain optical dimensions to enable a person who is able to accommodate to use the distance correction (i.e., the base power) for viewing both distant objects and near objects. The treatment zones of the dual-focus lens that have the add power also provide a myopically defocused image at both distant and near viewing distances.

Whilst these lenses have been found to be beneficial in preventing or slowing down the development or progression of myopia, annular add power regions can give rise to unwanted visual side effects. Light that is focused by the annular add power regions in front of the retina diverges from the focus to form a defocused annulus at the retina. Wearers of these lenses therefore may see a ring or 'halo' surrounding images that are formed on the retina, particularly for small bright objects such as street lights and car headlights. Also, rather than using the natural accommodation of the eye (i.e. the eye's natural ability to change focal length) to bring nearby objects into focus, in theory, wearers can make use of the additional focus in front of the retina that results from the annular add power region to focus near objects; in other words, wearers can inadvertently use the lenses in the same manner as presbyopia correction lenses are used, which is undesirable for young subjects.

Further lenses have been developed which can be used in the treatment of myopia, and which are designed to eliminate the halo that is observed around focused distance images in the MISIGHT (CooperVision, Inc.) lenses and other similar lenses described above. In these lenses, the annular region is configured such that no single, on-axis image is formed in front of the retina, thereby preventing such an image from being used to avoid the need for the eye to accommodate near targets. Rather, distant point light sources are imaged by the annular region to a ring-shaped focal line at a near add power focal surface, leading to a small spot size of light, without a surrounding 'halo' effect, on the retina at a distance focal surface.

It has been recognised that, over time, the eye may adapt to compensate for myopic defocus or light scattering features provided in a lens. This may reduce the effectiveness of lenses that aim to slow the progression of myopia. The present disclosure seeks to address this, and seeks to provide lenses for use in young subjects that prevent or slow worsening of myopia.

SUMMARY

The present disclosure provides, according to a first aspect, a contact lens for use in preventing or slowing the development or progression of myopia. The lens includes an optic zone and a peripheral zone surrounding the optic zone. The optic zone comprises a central region, the central region having a first optical axis and a curvature providing a base power and centred on a centre of curvature that is on the first optical axis. The optic zone comprises an annular region, wherein the annular region circumferentially surrounds the central region. The annular region comprises a treatment zone having a characteristic that reduces the contrast of an image of an object that is formed by light passing through the central region and the treatment zone compared to an image of an object that would be formed by light passing through the central region. The characteristic that causes the contrast reduction varies with meridian around the annular region. The peripheral zone either has a constant thickness profile in every meridian or a variation in thickness configured to promote rotation of the lens.

The present disclosure provides, according to a second aspect, a method of manufacturing a contact lens. The method comprises forming a contact lens, the lens including an optic zone and a peripheral zone. The optic zone comprises a central region, the central region having a first optical axis and a curvature providing a base power and centred on a centre of curvature that is on the first optical axis. The optic zone comprises an annular region, wherein the annular region circumferentially surrounds the central region. The annular region comprises a treatment zone having a characteristic that reduces the contrast of an image of an object that is formed by light passing through the central region and the treatment zone compared to an image of an object that would be formed by light passing through the central region. The characteristic that causes the contrast reduction varies with meridian around the annular region. The peripheral zone either has a constant thickness profile in every meridian, or a variation in thickness configured to promote rotation of the lens.

The present disclosure provides, according to a third aspect, a method of reducing progression of myopia. The method comprises providing a multifocal ophthalmic lens according to the first aspect to a myopic person who is able to accommodate for varying near distances.

It will of course be appreciated that features described in relation to one aspect of the present disclosure may be incorporated into other aspects of the present disclosure. For example, the method of the disclosure may incorporate features described with reference to the apparatus of the disclosure and vice versa.

DETAILED DESCRIPTION

Figure 1:
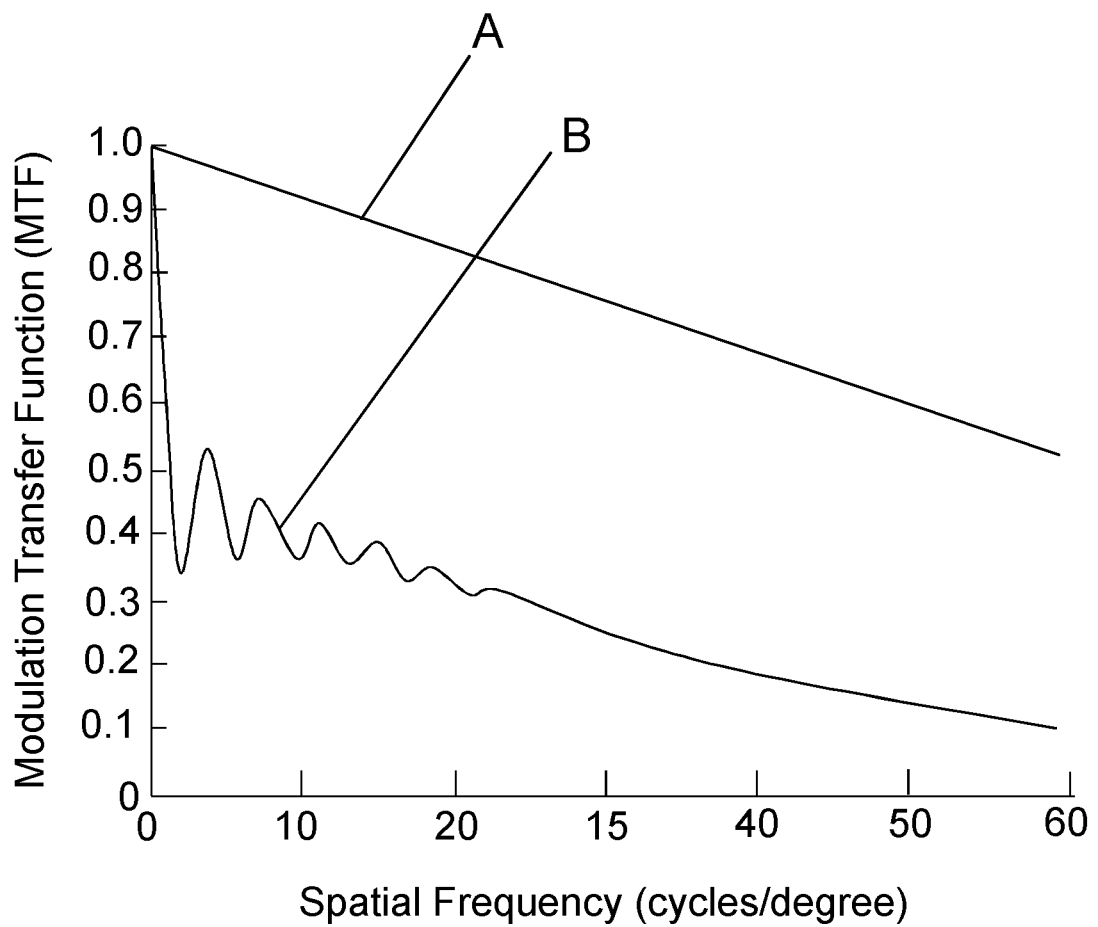
FIG. 1 is a schematic graph showing the decrease in modulation transfer function (MTF) with spatial frequency for an aberration free lens without an add power region, and for a lens comprising an annular add power region.

The present disclosure provides, according to a first aspect, a contact lens for use in preventing or slowing the development or progression of myopia. The lens includes an optic zone and a peripheral zone surrounding the optic zone. The optic zone comprises a central region, the central region having a first optical axis and a curvature providing a base power and centred on a centre of curvature that is on the first optical axis. The optic zone comprises an annular region, wherein the annular region circumferentially surrounds the central region. The annular region comprises a treatment zone having a characteristic that reduces the contrast of an image of an object that is formed by light passing through the central region and the treatment zone compared to an image of an object that would be formed by light passing through the central region. The characteristic that causes the contrast reduction varies with meridian. The peripheral zone either has a constant thickness profile in every meridian or a variation in thickness that is configured to promote rotation of the lens.

As used herein, the term contact lens refers to an ophthalmic lens that can be placed onto the anterior surface of the eye. It will be appreciated that such a contact lens will provide clinically acceptable on-eye movement and not bind to the eye or eyes of a person. The contact lens may be in the form of a corneal lens (e.g., a lens that rests on the cornea of the eye). The contact lens may be a soft contact lens, such as a hydrogel contact lens or a silicone hydrogel contact lens.

A contact lens according to the present disclosure comprises an optic zone. The optic zone encompasses parts of the lens that have optical functionality. The optic zone is configured to be positioned over the pupil of an eye when in use. For contact lenses according to the present disclosure, the optic zone comprises the central region, and the annular region that surrounds the central region and that comprises a treatment zone.

In the context of the present disclosure, the annular region is a substantially annular region that surrounds the optic zone. It may have a substantially circular shape or a substantially elliptical shape. It may fully surround the optic zone. It may partially surround the optical zone.

The treatment zone has a characteristic that causes a reduction in contrast of an image that is formed by light passing through the lens, compared to an image that would be formed by light passing through only the central region of the lens. In other words, the treatment zone causes a reduction in contrast of an image formed by light that has passed through the lens, compared to an image that would be formed by light passing through the same lens without a treatment zone. The treatment zone may comprise contrast-reducing features disposed on a surface of the lens. These features may give rise to additional scattering of light compared to light passing through the remainder of the annular region and the central region. The features may cause light to be diffracted differently compared to light passing through the remainder of the annular region and the central region. The treatment zone may have a curvature that refracts light differently to the remainder of the annular region and the central region, and thereby causes a contrast reduction of an image formed by light passing through the lens.

The treatment zone may be a continuous zone. The treatment zone may span less than half of the annular region. The treatment zone may span less than a quarter of the annular region. The annular zone may comprise a plurality of treatment zones. The contrast reduction may vary across the treatment zone of the lens. The boundary between any of the treatment zones and the remainder of the annular region may be a sharp boundary, or may be a smooth boundary. There may be a blending zone at the boundary between each treatment zone and the remainder of the annular region. The blending zone may have a characteristic that give rise to contrast reduction of an image that is formed by light passing through the lens, compared to an image that would be formed by light passing through the central region of the lens. The characteristic may vary and may dissipate in its contrast-reducing effect moving from the treatment zone to the annular region. For example, if the treatment zone has a curvature providing an add power, a blending zone between the treatment zone and the remainder of the annular region may have a gradual change in curvature, and may result in a gradual reduction in add power across the region. If the treatment zone comprises features that increase scattering of light, a blending zone between the treatment zone and the remainder of the annular region may include features that increase scattering, but the density of these features may vary across the blending zone.

The contrast reduction of an image of an object that is formed by light passing through the central region and the treatment zone compared to an image of an object that would be formed by light passing through only the central region alone can be quantified using the modulation transfer function (MTF).

Lenses do not perfectly reproduce the contrast of an object in an image of the object formed by the lens. The modulation transfer function (MTF) of a given lens measures the ability of the lens to transfer contrast from an object to an image of the object, at a particular resolution, and can be derived from the Fourier transform of the point or line spread function. The MTF can be measured by using a test object (an object to be imaged) of black and white line pairs. As line spacing of a test object decreases, (i.e. as the black and white line pairs get closer together, i.e. as spatial frequency increases), the line spread functions of the black lines start to overlap and so the difference between the black lines and their background is reduced in the image, and the MTF decreases.

For lenses according to embodiments of the present disclosure, the presence of the treatment zone reduces the MTF (and hence the contrast) of an image formed by light passing through the treatment zone and the central zone, compared to an image that would be formed by light passing through only the central zone. This can be better understood with reference to FIG. 1. As shown by curve A (dashed line), for an aberration free lens without an add power region, the MTF will decrease as a function of spatial frequency. For lenses that have an optic zone including an annular region having an add power, additional modulation is introduced into the MTF, as shown by curve B.

Figure 2:
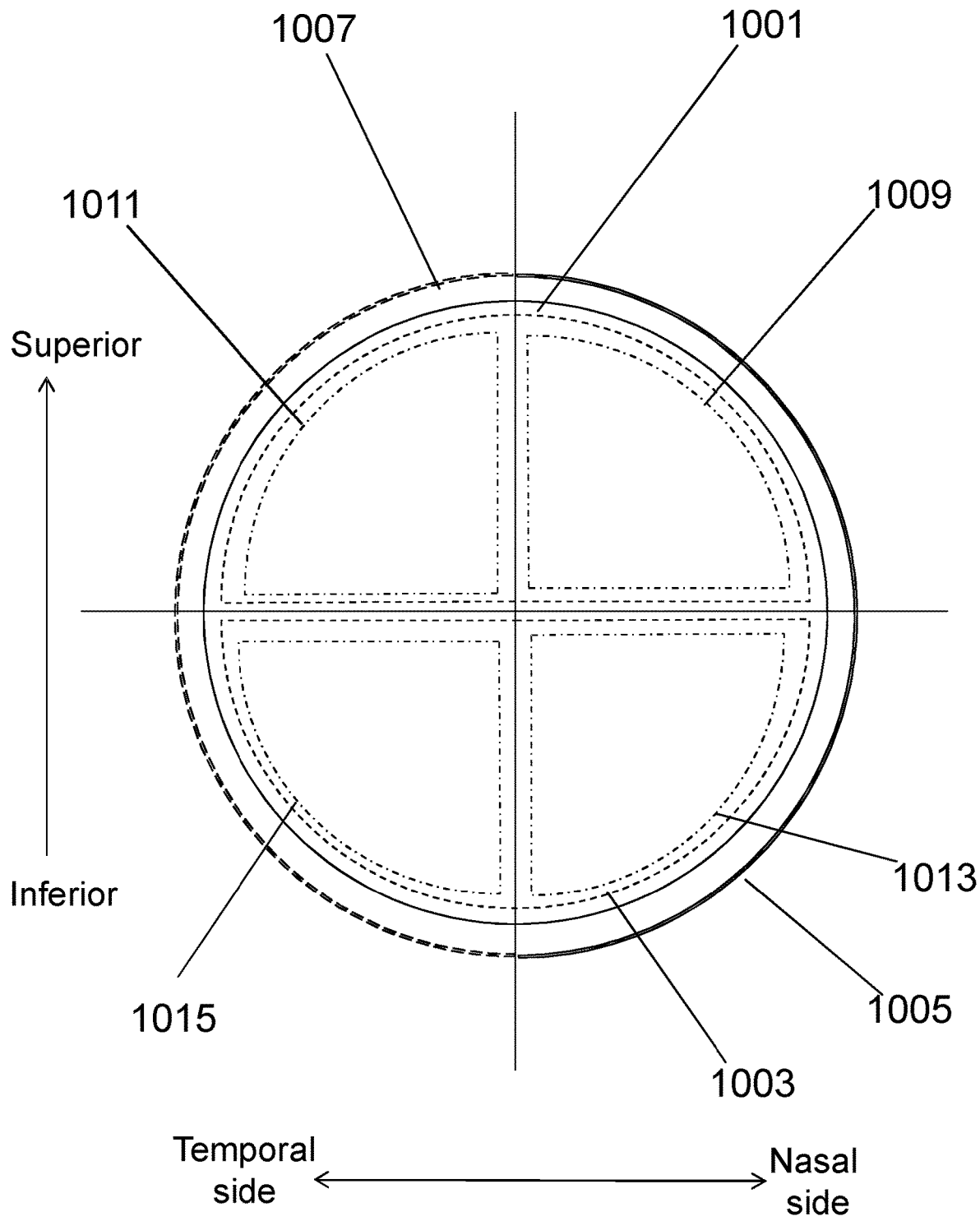
FIG. 2 is a schematic diagram showing visual fields of the eye divided into quadrants.

The visual fields of the eye can be divided into quadrants, as shown in FIG. 2, and these quadrants can also be used to describe the quadrants of a contact lens when positioned on an eye. The upper half of the eye/lens is the superior half 1001, and the lower half is the inferior half 1003. The visual field that is closest to the nose is the nasal half 1005, and the visual field that is furthest from the nose is the temporal half 1007. Four quadrants can therefore be defined as superior-nasal 1009, superior-temporal 1011, inferior-nasal 1013 and inferior-temporal 1015. In the description below, these definitions will be used to describe the position of the add power region and the variation in thickness of the peripheral region as they would be when the lens is in normal use and is being worn by a wearer.

The optic zone is surrounded by a peripheral zone. An edge zone may surround the peripheral zone. The peripheral zone is not part of the optic zone, but sits outside the optic zone and above the iris when the lens is worn, and it provides mechanical functions, for example, increasing the size of the lens thereby making the lens easier to handle, or providing a shaped region that improves comfort for the lens wearer. The peripheral zone may extend to the edge of the contact lens. In known contact lenses, for example, in toric lenses, the peripheral zone may provide ballasting to prevent rotation of the lens about the optical axis when the lens is worn by a wearer. The present disclosure relates to a contact lens that is designed to rotate on the eye, and in embodiments of the present disclosure, the peripheral zone either has a constant thickness profile or a thickness profile that is configured to promote rotation of the lens. In embodiments where the peripheral zone has a constant thickness in every meridian, the peripheral zone will not provide a ballasting effect and thus when the lens is worn by a wearer, it will rotate about the optical axis in response to a rotational force. In these embodiments, the thickness variation is the same in every meridian. The thickness profile may either vary along the meridian, or may be constant along the meridian. In embodiments where the peripheral zone has a thickness profile configured to promote rotation of the lens, the thickness of the peripheral zone may vary with meridian. The thickness profile variation may result from features disposed on a surface of the peripheral zone. The features may be designed to promote rotation of the lens in one direction about the optical axis in response to a rotational force. When contact lenses according to embodiments of the present disclosure are being worn, the rotational force may be provided by a wearer blinking. Rotation of the lens may also be assisted by gravitational forces acting upon the lens.

As the lens of the present disclosure is designed to rotate on the eye when worn by a wearer, the treatment zone will rotate relative to the eye when the lens is being worn. The treatment zone will therefore coincide with different regions of the retina at different times whilst the lens is being worn. This is believed to reduce the ability of the eye to compensate for the contrast reducing effects of the treatment zone.

The first optic axis of the centre region may lie along the centreline of the lens. The central region may focus light from a distant point object, on the first optical axis, to a spot on the first optical axis at a distal focal surface. The term surface, as used herein, does not refer to a physical surface, but to a surface that could be drawn through points where light from distant objects would be focused. Such a surface is also referred to as an image plane (even though it can be a curved surface) or image shell. The eye focuses light onto the retina which is curved, and in a perfectly focused eye, the curvature of the image shell would match the curvature of the retina. Therefore the eye does not focus light onto a flat mathematical plane. However, in the art, the curved surface of the retina is commonly referred to as a plane.

The peripheral zone may have a variation in thickness configured to promote rotation of the lens, and the thickness profile of the peripheral zone may have no axis of mirror symmetry. The thickness variation of the peripheral zone may vary in an aperiodic or irregular manner around all or part of the lens. The variation in thickness may be selected to achieve a desired amount of contact lens rotation on the eye without significantly decreasing contact lens comfort or lens awareness compared to a conventional spherical contact lens. The thickness of various regions of the peripheral zone can be selected using routine methods known to persons of ordinary skill in the art. Thicknesses and configurations can be selected to achieve the desired amount of contact lens rotation on the eye without significantly decreasing contact lens comfort or lens awareness compared to a conventional spherical contact lens. For example, in the design of the peripheral zone, a contact lens can be manufactured with a particular target design and thickness and clinically tested on an eye of a person. The amount of lens rotation can be observed by an eye care practitioner using a slit lamp or other conventional tool. Typically, multiple contact lenses with different thickness profiles will be manufactured and tested on-eye of many people (e.g., 20 or more) to assess lens rotation and lens comfort. If the lens rotation is insufficient, or if lens comfort is significantly reduced compared to a control lens, then a lens with a different thickness profile in the peripheral zone is manufactured and tested.

The peripheral zone may have a variation in thickness configured to promote rotation of the lens, and wherein the thickness of the peripheral zone is constant on one half of the lens and varies on the other half of the lens. Half of the lens may have a peripheral zone thickness that varies in an irregular or aperiodic manner. Half of the lens may provide a prism ballast or a periballast.

The peripheral zone may have a variation in thickness configured to promote rotation of the lens, and wherein the thickness of the peripheral zone varies periodically around the lens. The peripheral zone may comprise a plurality features that alter the thickness of the peripheral region. These features may be spaced at regular intervals around the lens. Each feature may have an asymmetric profile that promotes rotation of the lens in one direction. The features may be aligned such that the non-rotational force of blinking is translated into a rotational force, such that the lens rotates in one direction. Each feature may be provided on a surface of the peripheral zone. Each feature may be provided on an anterior surface of the peripheral zone. The periodic variation may be a sinusoid, triangular or sawtooth waveform. The periodic variation may span a portion of the circumference of the peripheral zone, or the entire circumference of the peripheral zone.

The annular region may comprise a plurality treatment zones separated by regions that do not substantially reduce the contrast of an image of an object that is viewed through the annular region compared to an image of an object that is viewed through the central region. The treatment zones may arranged at regular intervals around the circumference of the annular region. Alternatively, the treatment zones may be arranged at irregular intervals around the circumference of the annular region. Each treatment zone may span between 5% and 10% of the circumference of the peripheral zone. As described above, the peripheral zone of the lens allows the lens to rotate and/or promotes rotation. As the lens rotates relative to the eye when worn by a wearer, the treatment zones will be bought into line with different regions of the eye at different times, and this will reduce the ability of the eye to compensate for the image contrast reduction caused by the treatment zone.

The treatment zone may comprise a strong contrast reduction region having a characteristic that reduces the contrast of an image of an object that is formed by light passing through the treatment zone and the central region compared to an image of an object that would be formed by light passing through only the central region by 50% or more, wherein the area of the strong contrast reduction region is less than 50% of the area of the annular region. The strong contrast reduction region may reduce the contrast of the image formed by the lens by 75% of more. The strong contrast reduction region may span less than 25% of the annular region. The strong contrast reduction region may be a continuous region. There may be a plurality of disconnected strong contrast reduction regions.

The treatment zone may further comprise a weaker contrasting reduction region having a characteristic that reduces the contrast of an image of an object that is viewed through the treatment zone compared to an image of an object that is viewed through the central region between 10% and 50%. The treatment zone may comprise a periodic arrangement of strong contrast reducing zones separated by weaker contrast reducing zones. The annular region may comprise a plurality of treatment zones, some of which may be strong contrast reduction regions and others which might be weaker contrast reduction regions.

The treatment zone may comprise an add power region having a curvature providing an add power that varies with meridian. The anterior surface of the treatment zone may have a smaller radius of curvature than the radius of curvature of the anterior surface of the central region and the remainder of the annular region. The treatment zone may therefore have a greater power than the base power of the central region and the remainder of the annular region. The focal point of the treatment zone may lie on a proximal focal surface, and the focal point for the central region and the remainder of the annular region may lie on a distal focal surface, which is further away from the posterior surface of the lens. The focal point treatment zone and the focal point of the central region may share a common optical axis. For a point source at infinity, light rays focused by the central region and the annular region form a focused image at the distal focal surface. Light rays focused by the central region also produce an unfocused blur spot at the proximal focal surface. For each lens, at least some of the add power may be provided by curvature that is centred on a centre of curvature that is a first distance from the first optical axis. Light rays from a distant point source that pass through the add power region may be focused away from the first optical axis on a max add power focal surface. Light rays that pass through the central region will form an on-axis blur circle at the max add power focal surface. Light rays from a distant point source that pass through the max add power annular region may be focused outside the blur circle. The central region of the lens has the base power. If the treatment zone comprises an add-power region, the net near power of the treatment zone will be the sum of the base power and the add power. The centre of curvature of the add power region may be a first distance from the first optical axis.

The treatment zone of the annular region has a width, and a normal to a surface of the treatment zone taken halfway across the width of the treatment zone region may cross a normal, taken at the centre of the central region, at the centre of the curvature of a surface of the central region. The treatment zone may thereby focus light from each distant point object to form a focused arc at a proximal focal surface, the arc being outside of and extending in a direction around the blur circle formed by the light focused by the central region.

The treatment portion may be configured to generate a light distribution at a focal plane of the treatment portion that generally replicates any zonal geometry of the treatment portion. The focal plane of the treatment portion is defined by a plane that passes through a point at which light passing through the treatment portion is focused. For example, for a treatment portion that spans a portion of an annulus, a focused arc may be generated at the focal plane of the treatment portion. The curvature of the treatment portion can be selected so as to position light that is focused at a treatment portion focal plane at a distance of between about 2 micrometres and about 700 micrometres from and normal to the optic axis, preferably between about 20 micrometres and about 300 micrometres.

The surface of the treatment zone may be an anterior surface. The surface of the central zone may be an anterior surface. The surface of the treatment zone may be the surface that has a curvature providing an add power. The surface of the central zone may be the surface that has a curvature providing the base power.

The base power of the lens may be positive, and the treatment zone may have a power that is more positive than the base power. In this case, the max add power focal surface will be closer to the lens than the distal focal surface. An on-axis image will not be formed by light passing through the treatment zone. A wearer of the lens will therefore need to use the natural accommodation of their eye to bring nearby objects into focus. It may be that the light rays focused by the treatment do not intersect with the first optical axis of the contact lens at all, or not until after they have passed the max add power focal surface.

The base power of the lens may be negative, and the treatment zone may have a power that is less negative than the power of the base region, or the treatment zone may have a positive power. Considering the lens positioned on the cornea, if the power of the treatment zone is less negative than the base power, a max add power focal surface will be more anterior in the eye than the distal focal surface. Considering the lens when it is not positioned on the cornea, if the power of the treatment zone is positive, a max add power focal surface will be on the opposite (image) side of the lens than the distal focal surface (which will be a virtual focal surface on the object side of the lens); if the power of the treatment zone is negative (but less negative than the base power), a virtual add power focal surface will be further from the lens than a virtual distal focal surface.

When the lens is worn by a user, as the lens is designed to rotate about the optical axis relative to the eye, a treatment zone comprising an add power region may rotate to coincide with different regions of the eye. This is beneficial, particularly for hydrogel and silicone hydrogel contact lenses, as it is believed that over time, the eye may adapt to accommodate blur at the max add power focal surface, thereby reducing the effectiveness of an add power treatment zone preventing the worsening of myopia. Rotating the lens, and thereby rotating the add-power region about the optic axis will reduce the ability of the eye to compensate for blur over time. As the lens rotates, different parts of the retina will be exposed to different amounts of defocus, and this may be more effective in slowing the growth of myopia than a lens with a constant myopic defocus.

The add power region may have a curvature providing an add power of 0.5 D or more. The add power region may have a curvature providing a max add-power of at least 2.0 D. The treatment zone may further comprise a lower add power region having a curvature providing a low add-power of between 0 D and 1.5 D. Light rays from a distant point source that pass through the at least one low add power region may be focused at a lower add power focal surface. For a lens that has a positive base power and a lower-add-power region that has a more positive power than the base power, the lower add power focal surface will be closer to the lens than the distal focal surface but further from the lens than the max add power focal surface. An on-axis image will also not be formed by light passing through a low add power region. It may be that light rays focused by a low add power region do not intersect with the first optical axis of the contact lens at all, or not until after they have passed the lower and max add power focal surfaces. Considering a lens positioned on the cornea, if the lens has a negative base power, and at least one low add power region having a less negative power than the base power, an lower add power focal surface will be closer to the lens than the distal focal surface, but further away than the max add power focal surface. Considering a lens not positioned on the cornea, if the lens has a negative base power and at least one low add power region having a less negative power than the base power, a virtual add power focal surface will be further from the lens than the virtual distal focal surface, but closer than the virtual max add power focal surface. The centre of curvature of the add power region may be a first distance from the first optical axis, and the centre of curvature of the low add power region may be a second distance from the first optical axis.

The annular region may comprise at least one base-power region, having the curvature providing the base power and centred on the centre of curvature of the central region.

The curvatures providing any of the base power, the maximum add power, and the low add power may be curvatures of the anterior surface of the lens. The curvatures providing the base power, the maximum add power, and the intermediate add power may be curvatures of the posterior surface of the lens. The curvatures providing the base power, the maximum add power, and the intermediate add power may be curvatures of the anterior surface and the posterior surface of the lens providing a combined effect.

The treatment zone may include a feature that increases scattering of light passing through the treatment zone compared to light passing through the central region. The feature may be disposed on an anterior surface of the annular region. The treatment zone of each lens may comprise optical elements burned into a surface of the lens, or etched into the surface of the lens. Features that increase scattering of light passing through the treatment zone will reduce the contrast of an image formed from light passing through the treatment zone and the central region, compared to an image that would be formed from light that has only passed through the central region. As the lens rotates relative to the eye about the first optical axis, the treatment zone, and therefore the high scattering region will rotate about the first optic axis. This reduces the ability of the eye to compensate for the reduced contrast caused by the scattering.

The treatment zone may have a characteristic that causes diffraction of light passing through the treatment zone.

The contact lens may be substantially circular in shape and have a diameter from about 4 mm to about 20 mm, preferably between about 13.0 mm and 15.0 mm. As used herein a reference to a diameter is a reference to a chord diameter. The centre thickness of the lens may between about 50 micrometres and about 300 micrometres. The peripheral zone of the lens may have a thickness of between about 50 micrometres and about 450 micrometres. The thickness of the lens can be measured using conventional techniques and instruments such as a Rehder gauge. The central region may be substantially circular in shape and may have diameter of between about 2 and 9 mm, preferably between about, and more preferably between about 2 and 5 mm. The central region may be substantially elliptical in shape. The base curve may have a radius of curvature of between about 8.0 mm and 9.0 mm. The annular region may extend radially outwards from a perimeter of the central region by between about 0.1 to 4 mm, preferably between about 0.5 to 1.5 mm. For example, the radial width of the annular region may be about 0.1 mm to about 4 mm, and preferably may be about 0.5 mm to about 1.5 mm. The perimeter of the central region may define a boundary between the central region and the annular region, and the annular region may therefore be adjacent to the central region.

The annular region of each lens may abut the central region. A blending region may be provided between the central region and the annular region. The blending region should not substantially affect the optics provided by the central region and the annular region, and the blending region may have a radial width of 0.05 mm or less, although it may also be as wide as 0.2 mm, or as wide as 0.5 mm in some embodiments.

The annular region may extend radially outwards to abut the peripheral zone. The treatment zone may span the radial width of the annular zone.

The central region has a base power, which in the context of the present disclosure, is defined as the average absolute refractive power of the central region. Any base power meridians will also have the base power. The base power will correspond to the labelled refractive power of the contact lens as provided on the contact lens packaging (though in practice it may not have the same value). Thus, the lens powers given herein are nominal powers. These values may differ from lens power values obtained by direct measurement of the lens, and are reflective of the lens powers that are used to provide a required prescription power when used in ophthalmic treatment.

For lenses used in the treatment of myopia, the base power will be negative or close to zero, and the central region will correct for distance vision. The base power may be between 0.5 diopters (D) and −15.0 diopters. The base power may be from −0.25 D to −15.0 D.

The lens may comprise at least two concentric annular regions, wherein each of the annular region comprises a treatment zone that reduces the contrast of an image of an object that is formed by light passing through the central region and the treatment zone compared to an image of an object that would be formed by light passing through only the central region, wherein the contrast reduction varies with meridian around the annular region.

Preferably, the treatment zone or treatment zones do not include lenslets, or the annular region(s) are free of lenslets (that is, small lenses provided on a surface of the contact lens that have diameters that are smaller than the diameter of the optic zone of the contact lens).

The peripheral zone of the lens may comprise at least two concentric regions that have a variation in thickness configured to promote rotation of the lens regions. Each concentric region may have the same variation in thickness or a different variation in thickness. Each concentric region may have a periodic variation in thickness, in which case, the variations of adjacent concentric regions may be in phase or out of phase.

The contact lens may be a toric contact lens. For example, the toric contact lens may include an optic zone shaped to correct for a person's astigmatism.

The contact lens may comprise an elastomer material, a silicone elastomer material, a hydrogel material, or a silicone hydrogel material, or combinations thereof. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as described in the context of the present disclosure, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as described in the context of the present disclosure, has a water content from about 0% to less than 10% (wt/wt). Typically, the silicone elastomer materials used with the present methods or apparatus have a water content from 0.1% to 3% (wt/wt). Examples of suitable lens formulations include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, and the like.

Alternatively, the lens may comprise, consist essentially of, or consist of a silicone elastomer material. For example, the lens may comprise, consist essentially of, or consist of a silicone elastomer material having a Shore A hardness from 3 to 50. The shore A hardness can be determined using conventional methods, as understood by persons of ordinary skill in the art (for example, using a method DIN 53505). Other silicone elastomer materials can be obtained from NuSil Technology or Dow Chemical Company, for example.

According to a second aspect, the present disclosure provides a method of manufacturing a lens. The method may comprise forming a contact lens, wherein the lens comprises a central region, the central region having a base power, and an annular region, wherein the annular region surrounds the central region. The annular region comprises at comprises a treatment zone having a characteristic that reduces the contrast of an image of an object that is formed by light passing through the central region and the treatment zone compared to an image of an object that would be formed by light passing through only the central region. The characteristic that gives rise to contrast reduction varies with meridian around the annular region. The peripheral zone has a constant thickness profile in every meridian or a variation in thickness configured to promote rotation of the lens.

The lens may include any of the features set out above.

The method of manufacturing may comprise forming a female mold member with a concave lens forming surface and a male mold member with a convex lens forming surface. The method may comprise filling a gap between the female and male mold members with bulk lens material. The method may further comprise curing the bulk lens material to forms the lens.

The contact lens may be a formed using a lathing process. The lens can be formed by cast molding processes, spin cast molding processes, or lathing processes, or a combination thereof. As understood by persons skilled in the art, cast molding refers to the molding of a lens by placing a lens forming material between a female mold member having a concave lens member forming surface, and a male mold member having a convex lens member forming surface.

In a third aspect of the disclosure there is also provided a method of using the contact lens described herein. The methods may be effective in reducing progression of a refractive error, such as reducing the progression of myopia. The methods may be effective in reducing axial length progression. When the present lenses are used to reduce the progression of myopia, the methods include a step of providing the contact lenses to a person whose eyes are able to accommodate for varying near distances (e.g., in a range of from about 15 cm to about 40 cm). Some embodiments of the methods include a step of providing the ophthalmic lenses to a person that is from about 5 years old to about 25 years old. The providing can be performed by an eye care practitioner, such as an optician or optometrist. Alternately, the providing can be performed by a lens distributor that arranges for the delivery of the ophthalmic lenses to the lens wearer.

Figure 3:
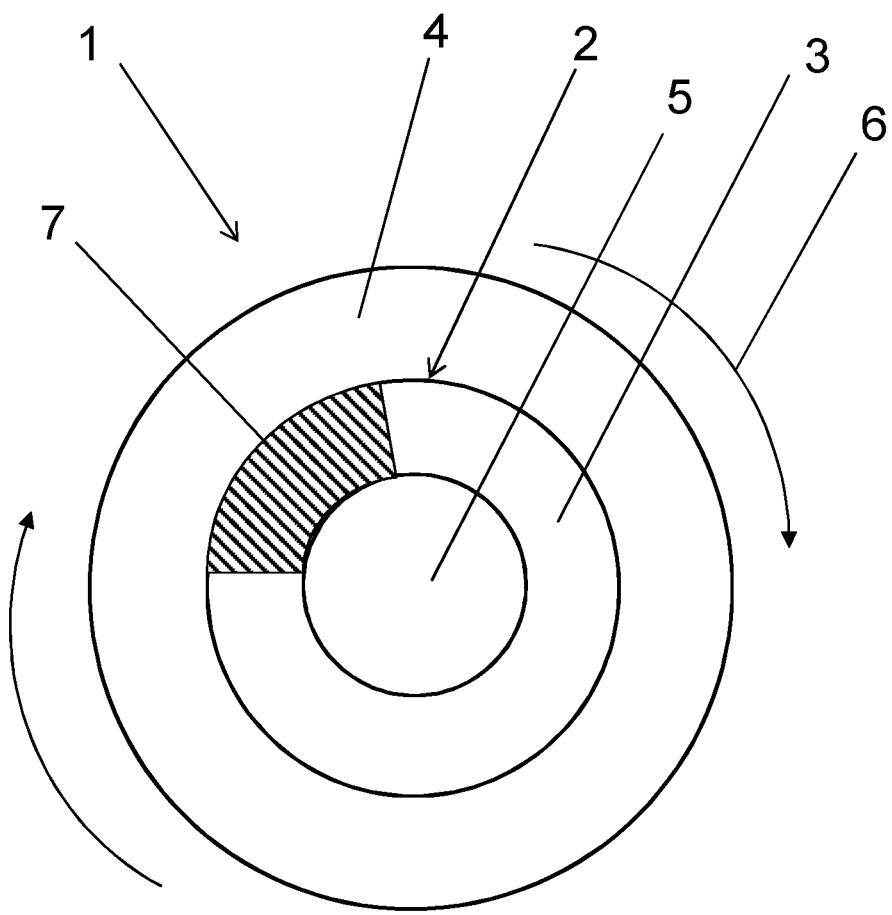
FIG. 3 is a schematic top view of a lens with a constant peripheral zone thickness, for use in the slowing progression of myopia (e.g., myopia control) according to an embodiment of the present disclosure.

FIG. 3 shows a schematic top view of a lens 1 for use in the slowing progression of myopia (e.g., myopia control) according to an embodiment of the present disclosure. The lens 1 comprises an optic zone 2, which approximately covers the pupil, and a peripheral zone 4 that sits over the iris. The peripheral zone 4 provides mechanical functions, including increasing the size of the lens thereby making the lens 1 easier to handle, and providing a shaped region that improves comfort for the lens 1 wearer. The peripheral zone 4 has a constant thickness profile and does not include any thickness variation, and therefore the peripheral zone 4 does not provide any ballasting and therefore the lens 1 will rotate (in a clockwise direction indicated by the arrows 6, or the opposite direction) about its optical axis in response to a rotational force. The optic zone 2 provides the optical functionality of the lens 1, and the optic zone comprises an annular region 3 and a central region 5. The annular region 3 comprises a treatment zone 7 that reduces the contrast of an image of an object that is formed by light passing through the central region and the treatment zone compared to an image of an object that would be formed by light passing through only the central region 5. This lens 1 has a positive base power, and the radius of curvature of the anterior surface of the treatment zone 7 is smaller than the radius of curvature of the anterior surface of the central region 5. The treatment zone 7 therefore has a greater power than the base power of the central region 5. When the lens 1 is worn by a wearer, the lens 1 will rotate in response to a rotational force that is imparted on the lens 1 when a wearer blinks. This leads to a rotation of the treatment zone 7. The treatment zone 7 therefore moves to coincide with different regions of the eye. This will reduce the ability of the eye to compensate for the contrast reduction caused by the treatment zone 7.

Figures 4A, 4B:
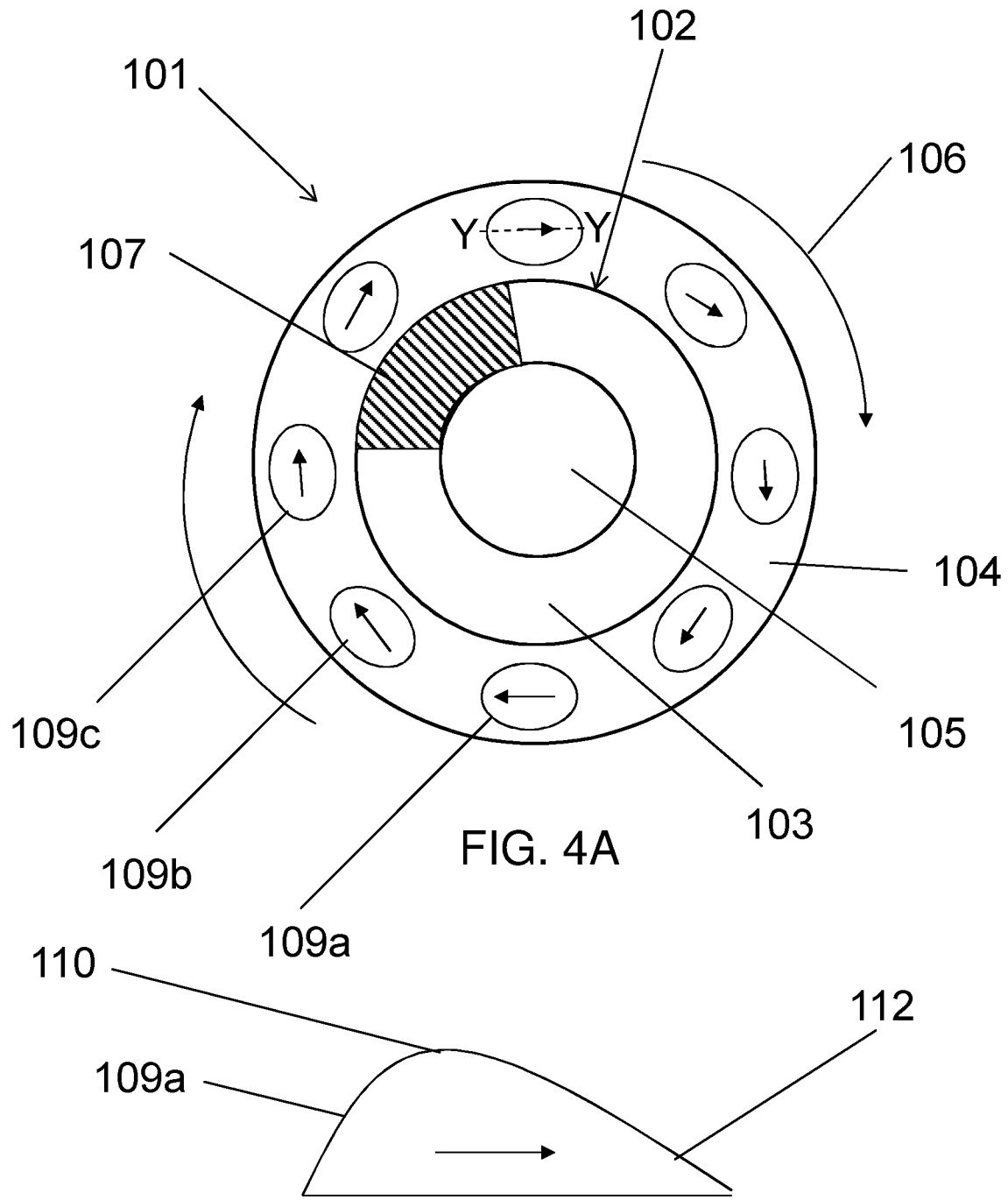
FIG. 4A is a schematic top view of a lens with a peripheral zone having seed-shaped ballasts, for use in the slowing progression of myopia (e.g., myopia control) according to an embodiment of the present disclosure.
FIG. 4B is a schematic cross section view along the line Y-Y of one of the seed-shaped ballasts of FIG. 4A.

FIG. 4A shows a schematic top view of a lens 101 for use in the slowing progression of myopia (e.g., myopia control) according to an embodiment of the present disclosure. The optic zone 102 of the lens 101 is similar to the optic zone of the lens shown in FIG. 1, comprising a central region 105 surrounded by an annular region 103. The annular region 103 comprises a treatment zone 107 that reduces the contrast of an image of an object that is formed by light passing through the central region and the treatment zone compared to an image of an object that would be formed by light passing through only the central region 105. The peripheral zone 104 comprises a plurality of seed-shaped ballasts 109*a*, 109*b*, 109*c*, disposed on the anterior surface of the lens 101 and arranged at regular intervals around the circumference of the lens 101. The ballasts 109*a*, 109*b*, 109*c*, promote rotation of the lens 101, each having a thicker portion 110 and a thinner portion 112 and a smooth, curved upper surface that gives rise to a continually varying thickness, as shown in FIG. 4B. They are arranged around the circumference of the peripheral zone 104 to bias the lens 101 to rotate about the first optical axis in a clockwise direction, as indicated by the arrow. If a wearer of the lens 101 blinks, their eyelid will impart a rotational force on the ballasts 109*a*, 109*b*, 109*c*, thereby causing the lens 101 to rotate.

Figures 5A, 5B:
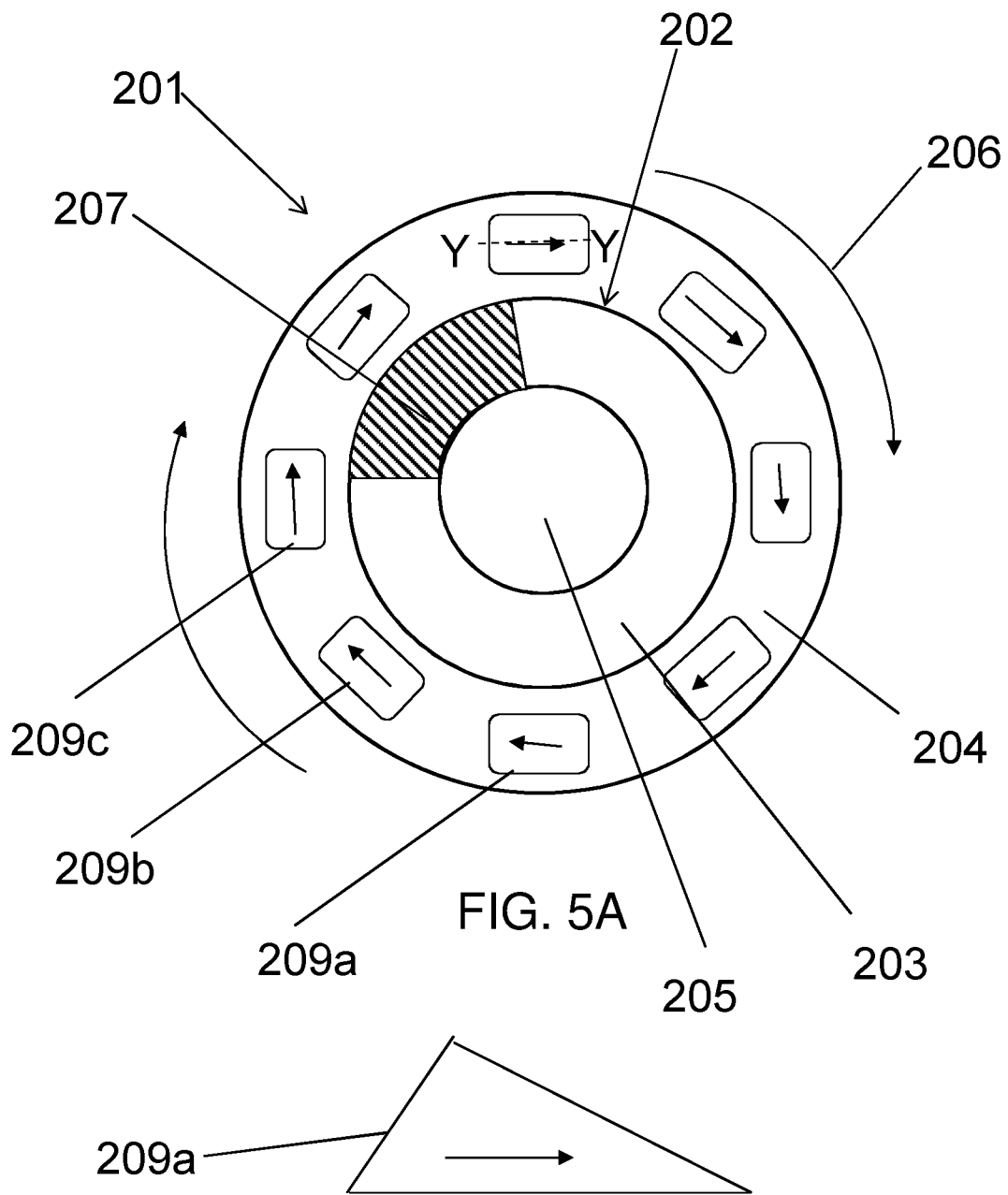
FIG. 5A is a schematic top view of a lens with a peripheral zone having prism-shaped ballasts, for use in the slowing progression of myopia (e.g., myopia control) according to an embodiment of the present disclosure.
FIG. 5B is a schematic cross section view along the line Y-Y of one of the prism-shaped ballasts of FIG. 5A.

FIG. 5A shows a schematic top view of a lens 201 for use in the slowing progression of myopia (e.g., myopia control) according to an embodiment of the present disclosure. The optic zone 202 of the lens 201 is similar to the optic zone of the lenses shown in FIG. 3 and FIG. 4A-B, comprising a central region 205 surrounded by an annular region 203. The annular region 203 comprises a treatment zone 207 that reduces the contrast of an image of an object that is formed by light passing through the central region and the treatment zone compared to an image of an object that would be formed by light passing through only the central region 205. The peripheral zone 204 comprises a plurality of prism-shaped ballasts 209*a*, 209*b*, 209*c*, disposed on the anterior surface of the lens 201, and arranged at regular around the circumference of the lens 201. The ballasts 209*a*, 209*b*, 209*c* promote rotation of the lens 201 in the direction indicated by the arrow 206. Each prism-shaped ballast 209*a*, 209*b*, 209*c*, has a thick portion 210 and a thin portion 212 as shown in FIG. 5B, but in contrast to the seed-shaped ballasts 109*a*, 109*b*, 109*c* of FIGS. 4A and 4B the prisms 209*a*, 209*b*, 209*c*, which comprise flat, straight surfaces, which may aid controlled rotation of the lens 201.

Figure 6A:
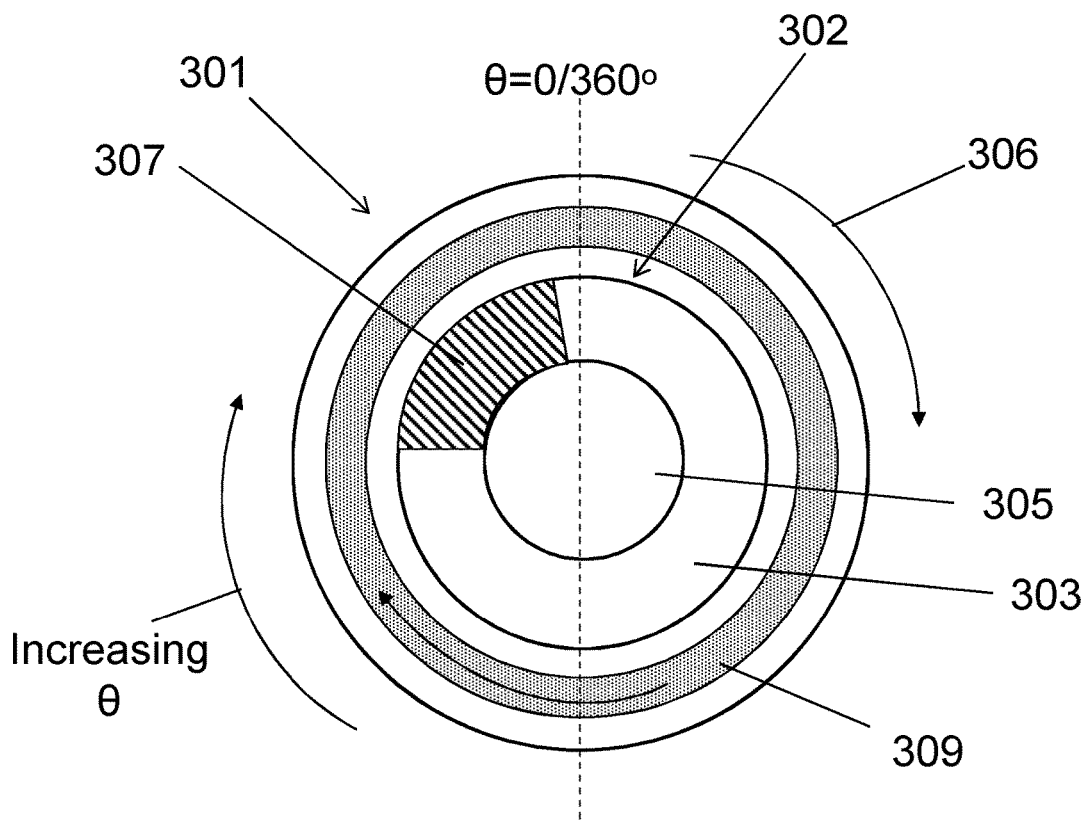
FIG. 6A is a schematic top view of a lens with a peripheral zone comprising a continuous ring that provides a varying thickness profile, for use in the slowing progression of myopia (e.g., myopia control) according to an embodiment of the present disclosure.
Figure 6B:
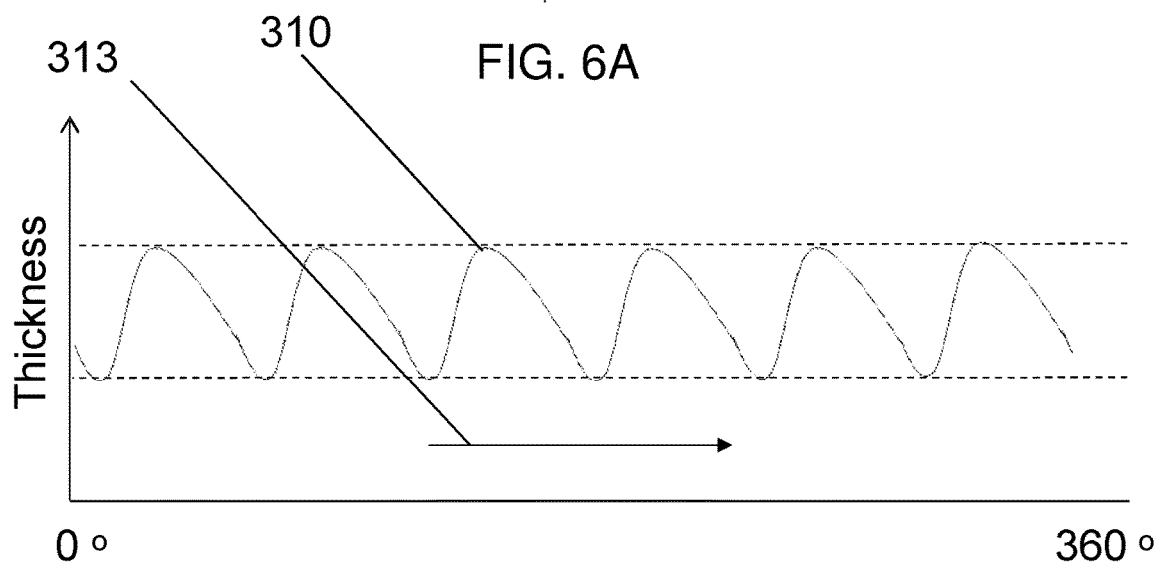
FIG. 6B is a graph showing the variation in thickness of the continuous ring of FIG. 6A around a portion of the peripheral zone.

FIG. 6A shows a schematic top view of a lens 301 for use in the slowing progression of myopia (e.g., myopia control)

according to an embodiment of the present disclosure. The optic zone 302 of the lens 301 is similar to the optic zone of the lenses shown in FIGS. 1-3, comprising a central region 305 surrounded by an annular region 303. The annular region 303 comprises a treatment zone 307 that reduces the contrast of an image of an object that is formed by light passing through the central region and the treatment zone compared to an image of an object that would be formed by light passing through only the central region 305. The peripheral zone 304 comprises a continuous band 309 that has a periodically varying thickness profile. The periodically varying thickness profile comprises a plurality of peaks spaced around the circumference of the peripheral zone 304. Defining the position around the circumference of the lens by an angle θ, where theta varies between 0° and 360° (as shown in FIG. 6A), the continuous band 309 has a peak 310 in thickness every 60 degrees, as shown in FIG. 6B. In order to promote rotation of the lens in the direction indicated by the arrow 306, each peak 310 has an asymmetric profile, which promotes rotation of the lens 301 in the direction indicated by arrow 313 in FIG. 6B.

Figures 7A, 7B, 7C:
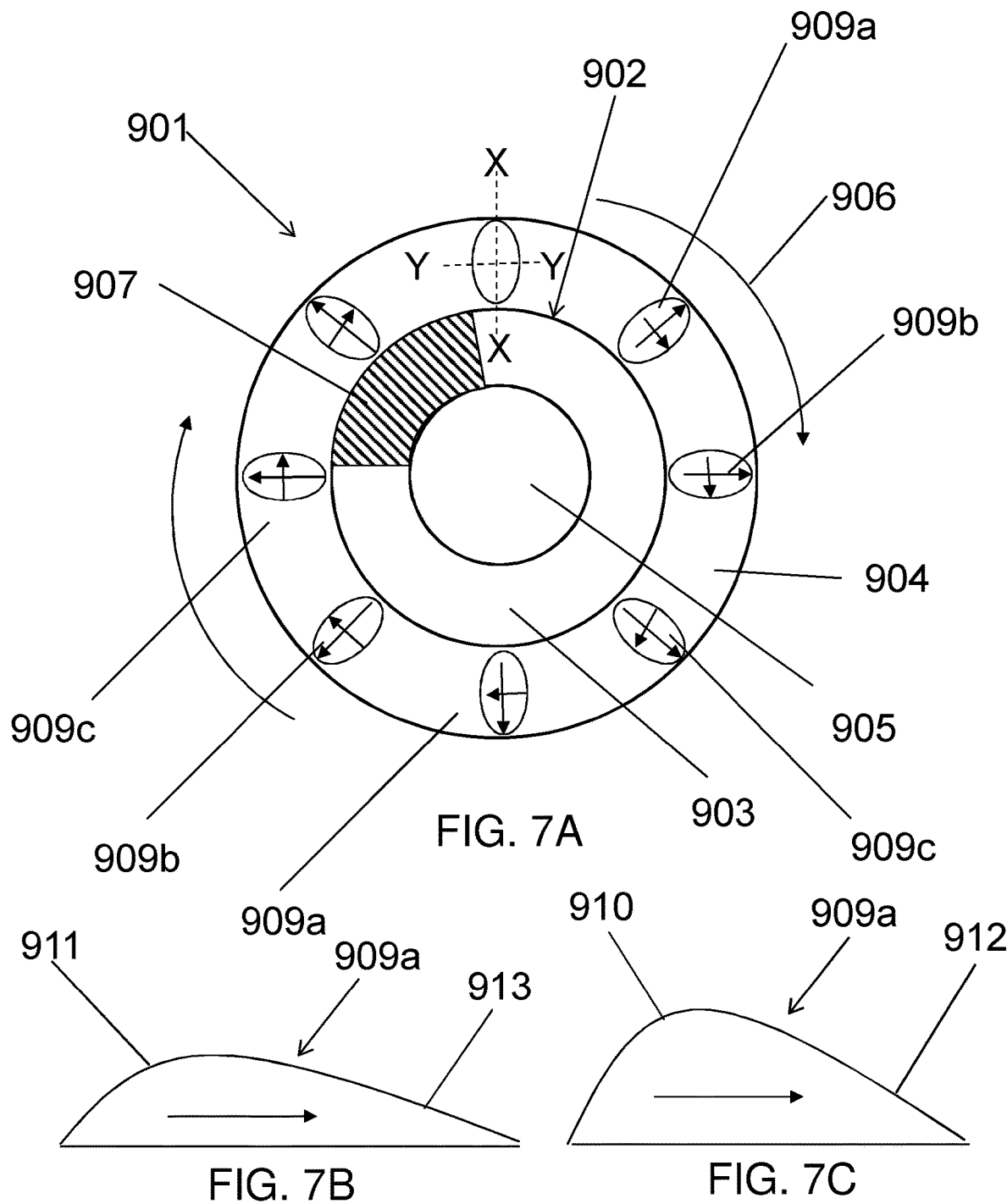
FIG. 7A is a schematic top view of a lens with a peripheral zone having ballasts that vary in thickness in a radial direction, for use in the slowing progression of myopia (e.g., myopia control) according to an embodiment of the present disclosure.
FIG. 7B is a schematic cross section taken the line X-X of one of the ballasts of FIG. 7A.
FIG. 7C is a schematic cross section taken the line Y-Y of one of the ballasts of FIG. 7A.

FIG. 7A shows a schematic top view of a lens 901 for use in the slowing progression of myopia (e.g., myopia control) according to an embodiment of the present disclosure. The optic zone 902 of the lens 901 is similar to the optic zone of the lens shown in FIG. 3, comprising a central region 905 surrounded by an annular region 903. The annular region 903 comprises a treatment zone 907 that reduces the contrast of an image of an object that is formed by light passing through the central region and the treatment zone compared to an image of an object that would be formed by light passing through only the central region 905. The peripheral zone 904 comprises a plurality of ballasts 909a, 909b, 909c, disposed on the anterior surface of the lens 901 and arranged at regular intervals around the circumference of the lens 901. The ballasts 909a, 909b, 909c are elongated in a radial direction. Similarly to the seed-shaped ballasts of FIGS. 4A-B, each ballast 909a, 909b, 909c has a continually varying thickness profile along the line Y-Y, as shown in FIG. 7C with a thicker portion 910 and a thinner portion 912, and the ballasts 909a, 909b, 909c are arranged around the circumference of the peripheral zone 904 to promote rotation of the lens 901 in the direction of the arrow 906. Additionally, each ballast 909a, 909b, 909c, has a varying thickness profile along the line X-X (as shown in FIG. 7B), having a thicker portion 911 towards the centre of the lens 901, and a thinner portion 913 towards the outer edge of the peripheral zone 904.

Figures 8A, 8B:
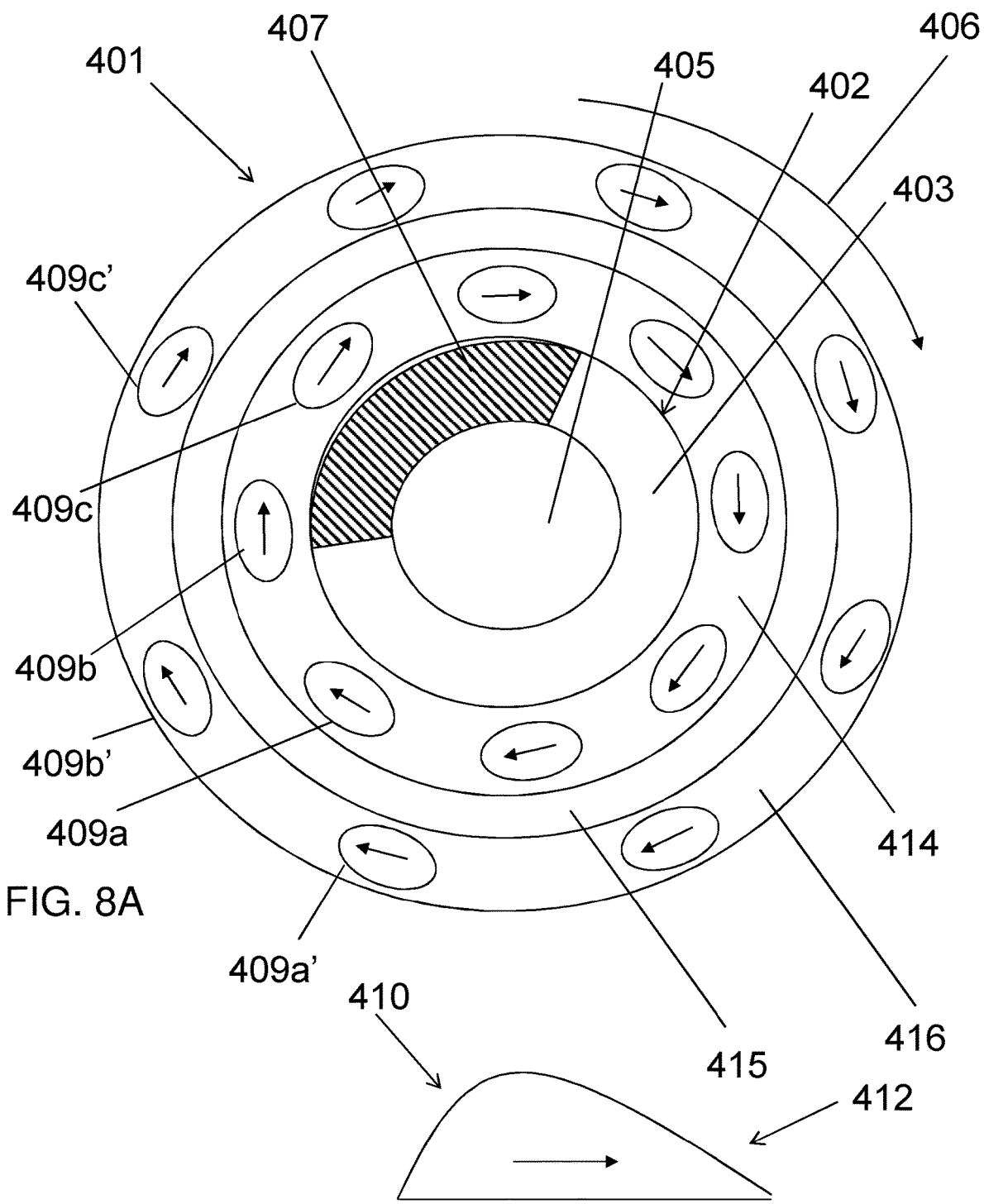
FIG. 8A is a schematic top view of a lens with a peripheral zone comprising a plurality of concentric zones, each concentric zone having seed-shaped ballasts, for use in the slowing progression of myopia (e.g., myopia control) according to an embodiment of the present disclosure.
FIG. 8B is a schematic cross section view taken through one of the seed-shaped ballasts of FIG. 8A.

FIG. 8A shows a schematic top view of a lens 401 for use in the slowing progression of myopia (e.g., myopia control) according to an embodiment of the present disclosure. The optic zone 402 of the lens 401 is similar to the optic zone of the lenses shown in FIGS. 3-7, comprising a central region 405 surrounded by an annular region 403. The annular region 403 comprises a treatment zone 407 that reduces the contrast of an image of an object that is formed by light passing through the central region and the treatment zone compared to an image of an object that would be formed by light passing through only the central region 405. The peripheral zone 404 comprises two concentric regions 414, 416, each having a periodically varying thickness profile, separated by a region that has a constant thickness profile 415. Each concentric region 414, 416, comprises a plurality of seed-shaped ballasts 409a, 409b, 409c, 409a', 409b', 409c' disposed on the anterior surface of the lens 101 and arranged at regular around the circumference of the lens 101. These ballasts 409a, 409b, 409c, 409a', 409b', 409c' promote rotation of the lens 401. The ballasts 409a, 409b, 409c, 409a', 409b', 409c' each have a thicker portion 410 and a thinner portion 412 and a smooth, curved outer surface that gives rise to a continually varying thickness, as shown in FIG. 8B. For each of the concentric regions 414, 416, the ballasts 409a, 409b, 409c, 409a', 409b', 409c' are arranged at regular intervals around the peripheral zone 404, but the ballasts 409a, 409b, 409c of the first region 414 are out of phase with the ballasts 409a', 409b', 409c' of the second region 416. The ballasts 409a, 409b, 409c, 409a', 409b', 409c' bias the lens 401 to rotate about the first optical axis in a clockwise direction, as indicated by the arrow 406. If a wearer of the lens 401 blinks, their eyelid will impart a rotational force on the ballasts 409a, 409b, 409c, 409a', 409b', 409c', thereby causing the lens 401 to rotate.

In other embodiments of the present disclosure, the ballasts disposed on concentric regions of the peripheral zone may be in phase for each of the concentric regions.

Figure 9:
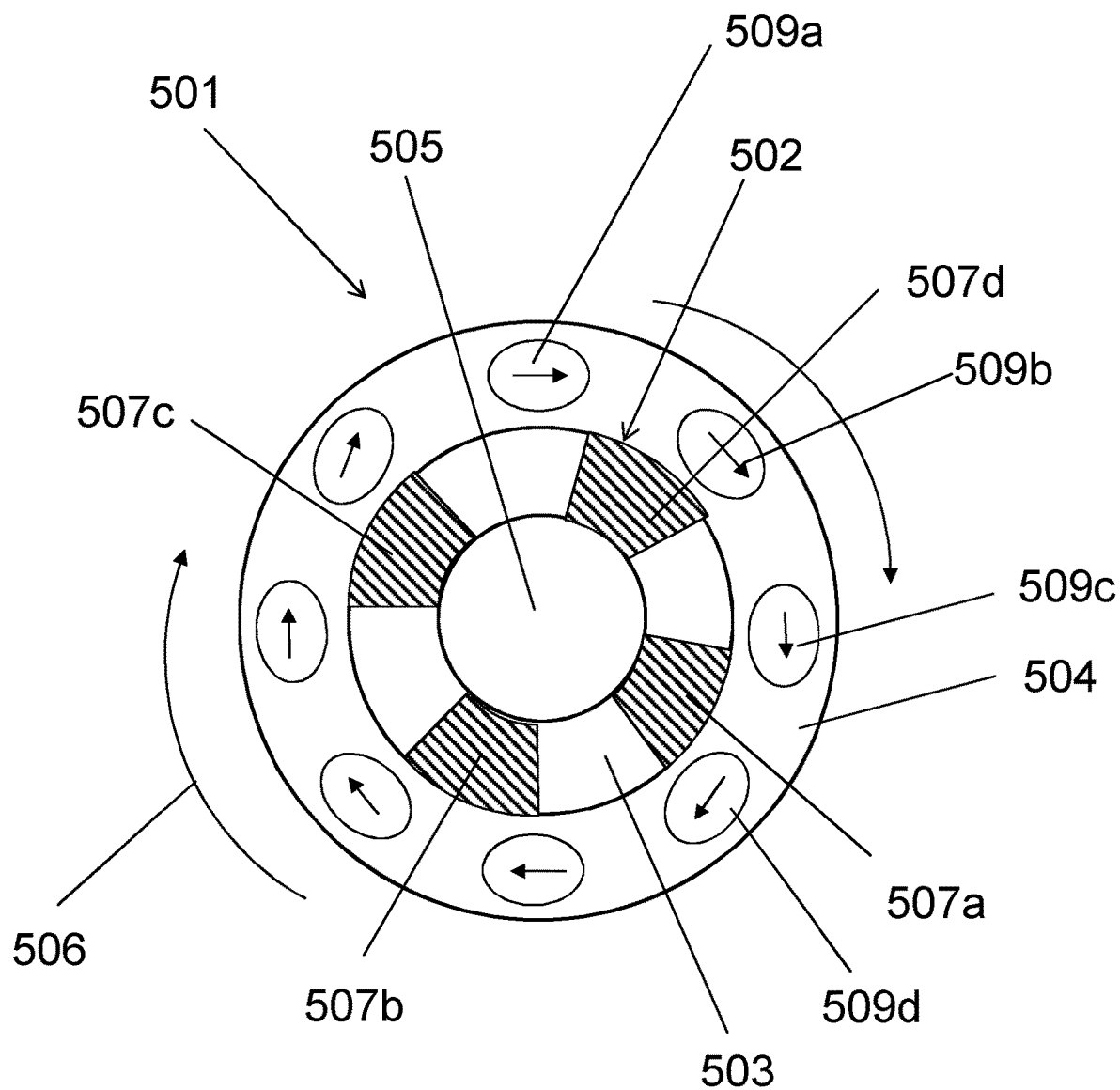
FIG. 9 is a schematic top view of a lens with an annular region that comprises a plurality of treatment zones, for use in the slowing progression of myopia (e.g., myopia control) according to an embodiment of the present disclosure.

FIG. 9 shows a schematic top view of a lens 501 for use in the slowing progression of myopia (e.g., myopia control) according to an embodiment of the present disclosure. The optic zone 502 comprises a central region 505 surrounded by an annular region 503. The annular region 503 comprises a plurality of treatment zones 507a, 507b, 507c, 507d, that reduce the contrast of an image of an object that is formed by light passing through the central region and the treatment zone compared to an image of an object that would be formed by light passing through only the central region 505. In between the treatment zones 507a, 507b, 507c, 507d there are regions that do not significantly reduce the contrast of an image formed by light passing through the lens 501. The peripheral zone 504 comprises a plurality of seed-shaped ballasts 509a, 509b, 509c, disposed on the anterior surface of the lens 501 and arranged at regular around the circumference of the lens 501. These ballasts 509a, 509b, 509c, promote rotation of the lens 501 about the first optical axis in a clockwise direction, as indicated by the arrow 506. If a wearer of the lens 501 blinks, their eyelid will impart a rotational force on the ballasts 509a, 509b, 509c, thereby causing the lens 501 to rotate. As the lens 501 rotates about the first optical axis in response to a rotational force, the treatment zones 507a, 507b, 507c, 507d will be bought into coincidence with different regions of the eye. This reduces the ability of the eye to compensate for the contrast reduction caused by the treatment zones 507a, 507b, 507c, 507d.

Figure 10:
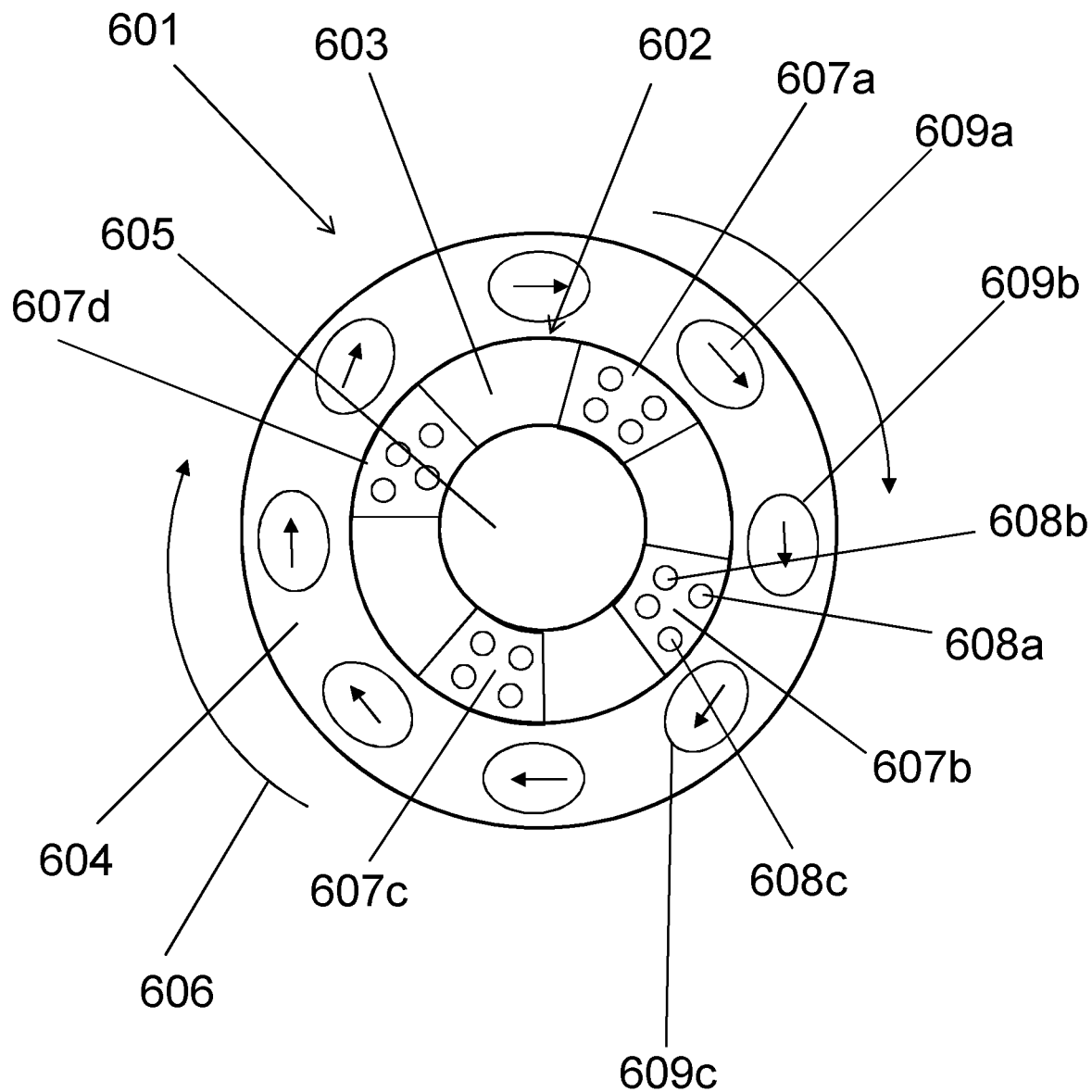
FIG. 10 is a schematic top view of a lens with a peripheral zone comprising a plurality of treatment zones that include scattering elements, for use in the slowing progression of myopia (e.g., myopia control) according to an embodiment of the present disclosure.

FIG. 10 shows a schematic top view of a lens 601 for use in the slowing progression of myopia (e.g., myopia control) according to an embodiment of the present disclosure. The optic zone 602 comprises a central region 605 surrounded by an annular region 603. The annular region 603 comprises a plurality of treatment zones 607a, 607b, 607c, 607d, that increase the scattering of light passing through the treatment zones, thereby reducing the contrast of an image of an object that is formed by light passing through the central region and the treatment zone compared to an image of an object that would be formed by light passing through only the central region 605. Each treatment zone 607a, 607b, 607c, 607d comprises a plurality of scattering elements 608a, 608b, 608c which have been burned into the anterior surface of the peripheral zone 604. In between the treatment zones 607a, 607b, 607c, 607d there are regions that do not significantly reduce the contrast of an image formed by light passing through the lens 601. The peripheral zone 604 comprises a plurality of seed-shaped ballasts 609a, 609b, 609c, disposed on the anterior surface of the lens 601 and arranged at regular around the circumference of the lens 601. These ballasts 609a, 609b, 609c, promote rotation of the lens 601 about the first optical axis in a clockwise direction, as indicated by the arrow 606. If a wearer of the lens 601 blinks, their eyelid will impart a rotational force on the ballasts 609a, 609b, 609c, thereby causing the lens 601 to rotate. As the lens 601 rotates about the first optical axis in response to a rotational force, the treatment zones 607a, 607b, 607c, 607d will be bought into coincidence with different regions of the eye. This reduces the ability of the eye to compensate for the increased scattering of light caused by the treatment zones 607a, 607b, 607c, 607d.

Figure 11A:
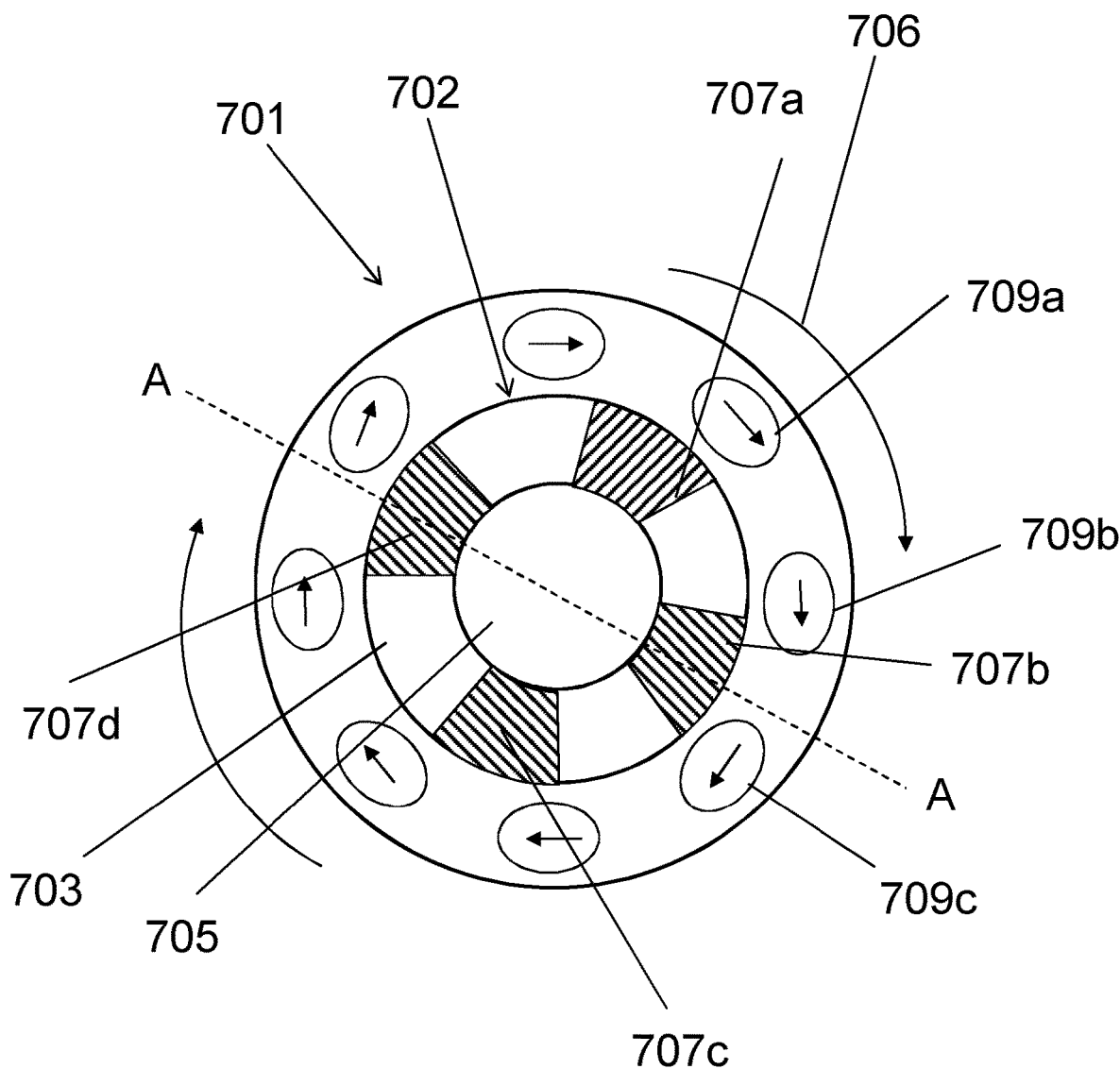
FIG. 11A is a schematic top view of a lens with a peripheral zone comprising a plurality of treatment zones that have a curvature providing an add power, for use in the slowing progression of myopia (e.g., myopia control) according to an embodiment of the present disclosure.
Figure 11B:
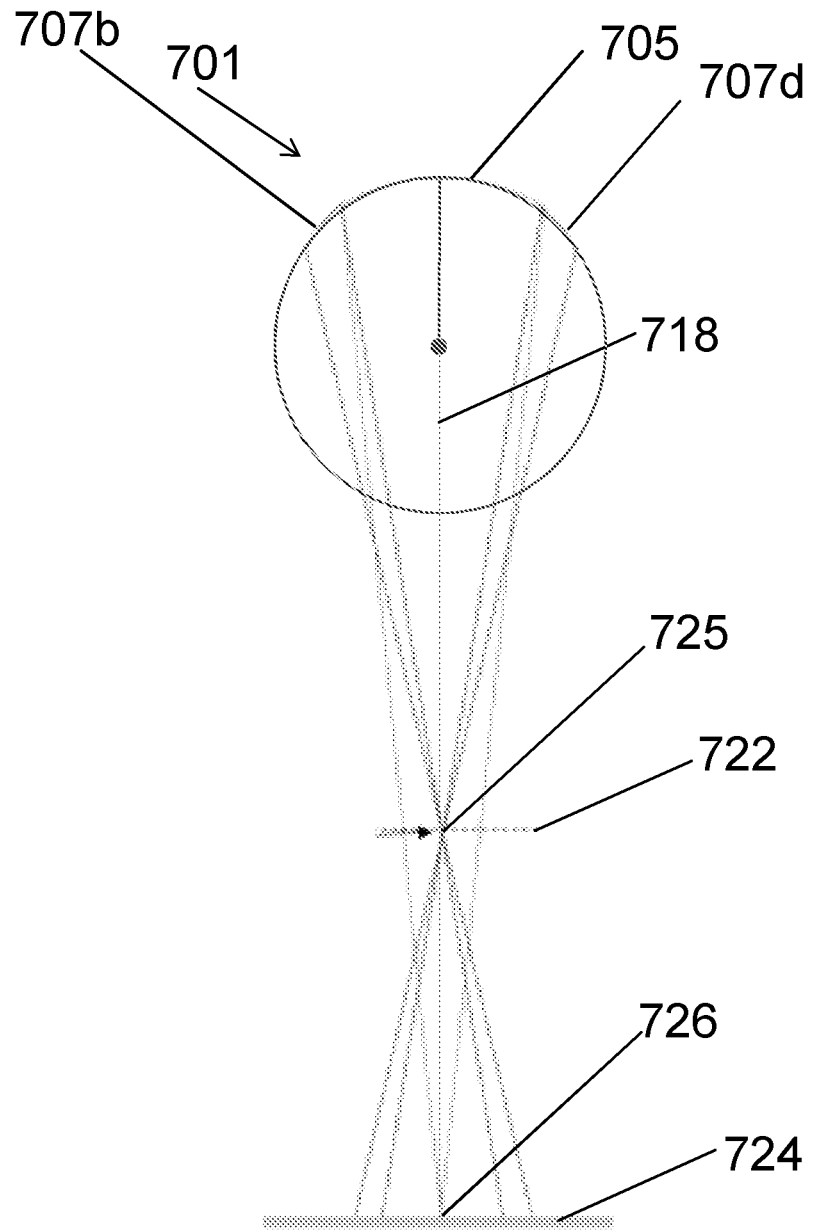
FIG. 11B is a schematic ray diagram for the optic zone of the lens of FIG. 11A, taken along the line A-A.

FIG. 11A shows a schematic top view of a lens 701 for use in the slowing progression of myopia (e.g., myopia control) according to an embodiment of the present disclosure. The optic zone 702 comprises a central region 705 surrounded by an annular region 703. The central region 705 has a curvature providing a base power and centred on a centre of curvature that is on the first optical axis 718. This is shown in FIG. 11B which is a schematic of a cross section through the optic zone of the lens taken along the line A-A.

The annular region 703 comprises a plurality of treatment zones 707a, 707b, 707c, 707d. Each treatment zone 707a, 707b, 707c, 707d has a curvature that provides an add-power. The radius of curvature of the anterior surface of the treatment zones 707a, 707b, 707c, 707d is smaller than the radius of curvature of the anterior surface of the central region 705. The treatment zones 707a, 707b, 707c, 707d therefore have a greater power than the base power of the central region 705. As shown in FIG. 11B, the focal point 725 of the treatment zones 707b, 707d lies on a proximal focal surface 722, and the focal point 726 for the central region 705 lies on a distal focal surface 724, which is further away from the posterior surface of the lens 701. The focal point 725 of the treatment zones 707b, 707d and the focal point 724 of the central region 705 share a common optical axis 718. For a point source at infinity, light rays focused by the central region 705 form a focused image at the distal focal surface 724. Light rays focused by the central region 705 also produce an unfocused blur spot at the proximal focal surface 722. Light rays focused by the treatment zones 707b, 707d form a focused image at the proximal focal surface 722. Light rays 720 focused by the treatment zones 707b, 707d diverge after the proximal focal surface 722.

The add-power treatment zones 707a, 707b, 707c, 707d reduce the contrast of an image of an object that is formed by light passing through the central region and the treatment zone compared to an image of an object that would be formed by light passing through only the central region 705. In between the treatment zones 707a, 707b, 707c, 707d there are regions that do not significantly reduce the contrast of an image formed by light passing through the lens 701. The peripheral zone 704 comprises a plurality of seed-shaped ballasts 709a, 709b, 709c, disposed on the anterior surface of the lens 701 and arranged at regular around the circumference of the lens 701. These ballasts 709a, 709b, 709c, promote rotation of the lens 701 about the first optical axis in a clockwise direction, as indicated by the arrow 606. If a wearer of the lens 701 blinks, their eyelid will impart a rotational force on the ballasts 709a, 709b, 709c, thereby causing the lens 701 to rotate. As the lens 701 rotates about the first optical axis in response to a rotational force, the treatment zones 707a, 707b, 707c, 707d will be bought into coincidence with different regions of the eye. This reduces the ability of the eye to compensate for the defocusing effect of the treatment zones 707a, 707b, 707c, 707d.

Figure 12A:
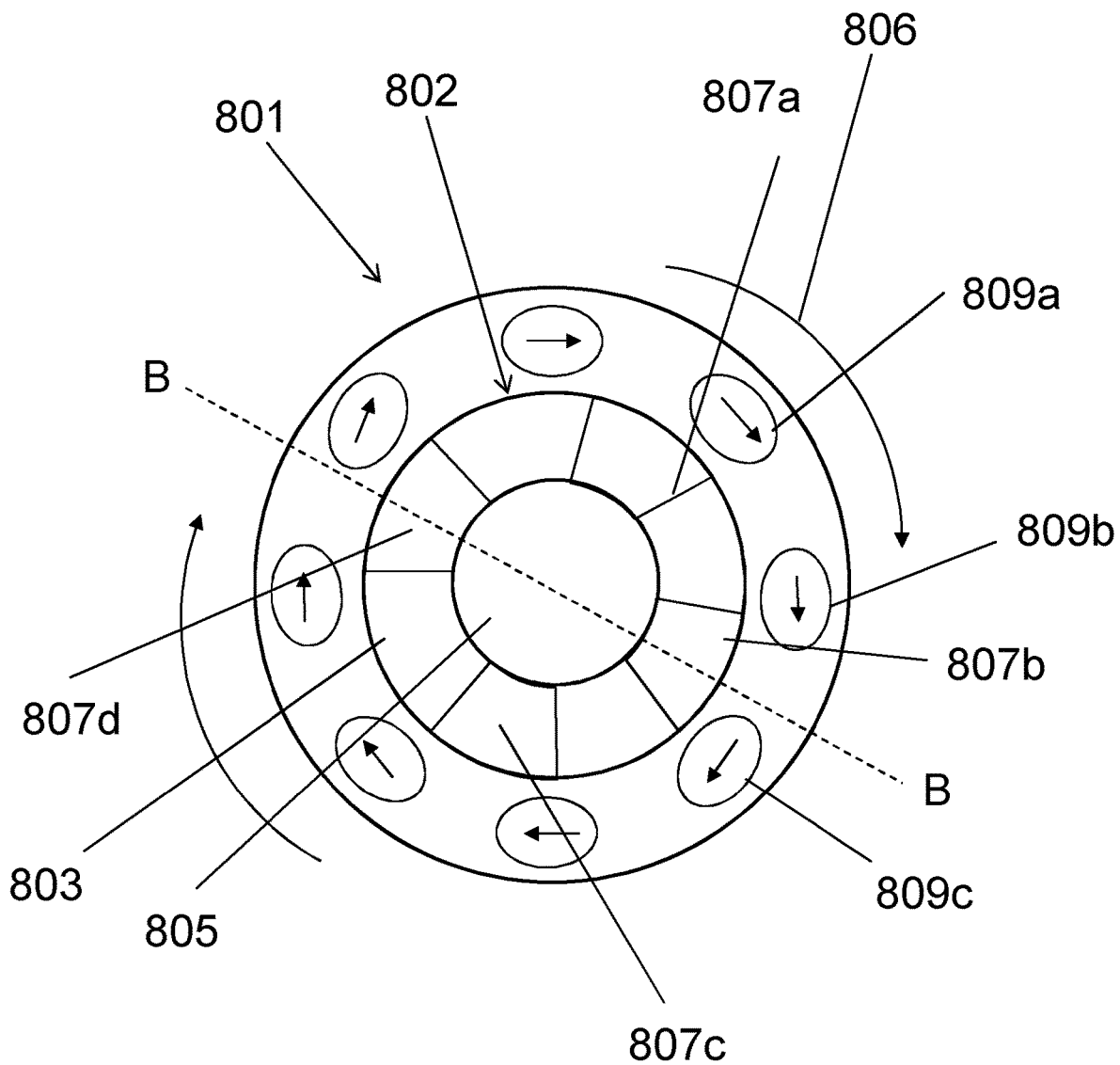
FIG. 12A is a schematic top view of a lens with a peripheral zone comprising a plurality of treatment zones that have a curvature providing an add power, wherein the centre of curvature of the treatment zones is offset from the first optical axis, according to an embodiment of the present disclosure.

FIG. 12A shows a schematic top view of a lens 801 for use in the slowing progression of myopia (e.g., myopia control) according to an embodiment of the present disclosure. The optic zone 802 comprises a central region 805 surrounded by an annular region 803. The central region 805 has a curvature providing a base power and centred on a centre of curvature that is on the first optical axis 818. This is shown in FIG. 12B which is a schematic of a cross section through the lens taken along the line B-B.

The annular region 803 comprises a plurality of treatment zones 807a, 807b, 807c, 807d. Each treatment zone 807a, 807b, 807c, 807d has a curvature that provides an add-power. The radius of curvature of the anterior surface of the treatment zones 807a, 807b, 807c, 807d (indicated by the dashed circles) is smaller than the radius of curvature of the anterior surface of the central region 805. The treatment zones 807a, 807b, 807c, 807d therefore have a greater power than the base power of the central region 805. As shown in FIG. 12B, the anterior surface of the central region 805 defines a portion of a surface of a sphere of radius 828 (indicated by the dot dash circle). The anterior surface of the treatment zones 807b, 807d defines a curved annular surface with radius of curvature 829.

Figure 12B:
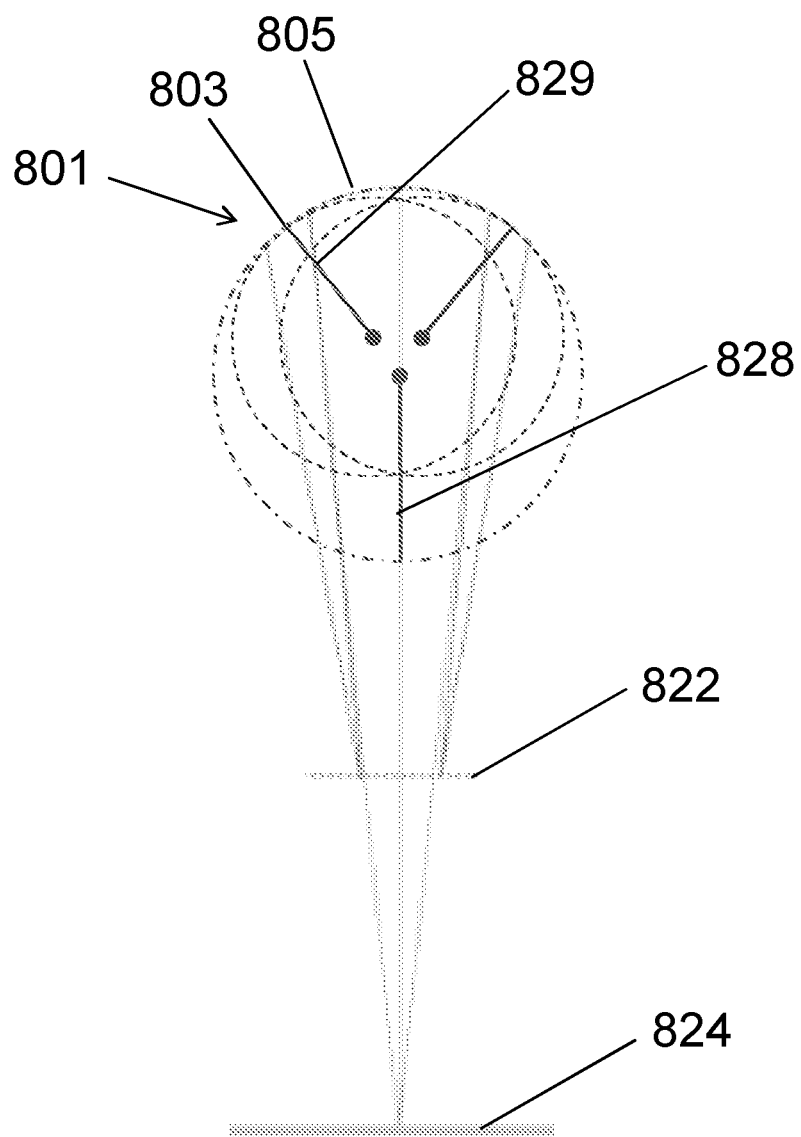
FIG. 12B is a schematic partial ray diagram for the optic zone of the lens of FIG. 12A, taken along the line B-B showing the radii of curvature of the central zone and the treatment zones.
Figure 12C:
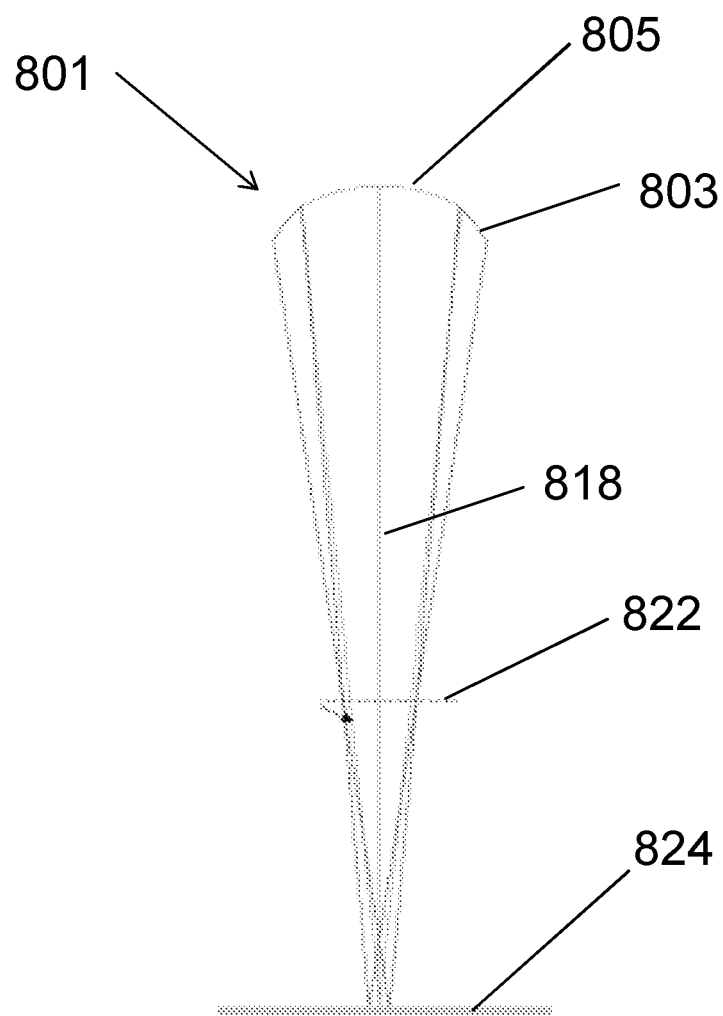
FIG. 12C is a further schematic ray diagram for the optic zone of the lens of FIG. 12A, taken along the line B-B.

As shown in FIGS. 12B and 12C, at the distal focal surface 824, light rays passing through the central region 805 are focused. A single image is not formed at the proximal focal surface 822. At the proximal focal surface 822, for a point source at infinity, light rays passing through the central region 805 generate a blur circle. However, light rays from a distant point source passing through the treatment zones 807b, 807d, generate focused arcs which surround the blur circle.

The add-power treatment zones 807a, 807b, 807c, 807d reduce the contrast of an image of an object that is formed by light passing through the central region and the treatment zone compared to an image of an object that would be formed by light passing through only the central region 805. In between the treatment zones 807a, 807b, 807c, 807d there are regions that do not significantly reduce the contrast of an image formed by light passing through the lens 801. The peripheral zone 804 comprises a plurality of seed-shaped ballasts 809a, 809b, 809c, disposed on the anterior surface of the lens 801 and arranged at regular around the circumference of the lens 801. These ballasts 809a, 809b, 809c, promote rotation of the lens 801 about the first optical axis in a clockwise direction, as indicated by the arrow 606. If a wearer of the lens 801 blinks, their eyelid will impart a rotational force on the ballasts 809a, 809b, 809c, thereby causing the lens 801 to rotate. As the lens 801 rotates about the first optical axis in response to a rotational force, the treatment zones 807a, 807b, 807c, 807d will be bought into coincidence with different regions of the eye. This reduces the ability of the eye to compensate for the defocusing effect of the treatment zones 807a, 807b, 807c, 807d.

In an example embodiment (not shown), the lens may comprise a plurality of concentric annular regions, each annular region comprising at least one treatment zone. The concentric annular regions may be separated by regions having the base power of the central zone.

It will be appreciated that a wearer may be provided with a lens for wearing on the right eye, and a lens for wearing on the left eye. Considering pair of lenses (a right eye lens and a left eye lens) for wearing on a given day, both lenses may have a treatment zone spanning the same half or quadrant of the annular region. For example, both lenses may have a treatment zone spanning the temporal half of the lens, targeting the nasal retina. The treatment zone of the right eye lens will have a strong contrast reducing effect on the left retina of the right eye. The treatment zone of the left eye lens will have a strong contrast reducing effect on the right retina of the left eye. Correspondingly, the right eye lens will have a weak contrast reducing effect at the right retina of the right eye, and the left eye lens will have a weak contrast reducing effect at the left retina of the left eye. The brain will receive signals from both the eyes and both regions of the retina, but the weakly contrast reduced image will dominate the binocular neural image in the cortex. Therefore at the level of perception, image degradation may be avoided during normal binocular viewing.

The embodiments shown in FIGS. 3-8 above show example features that influence rotation of a lens and that fall within the scope of the present disclosure. Embodiments shown in FIGS. 9-12 show example annular regions that fall within the scope of the present disclosure. It will be appreciated by those of ordinary skill in the art that features of these example embodiments may be combined in other embodiments that fall within the scope of the present disclosure.

Whilst in the foregoing description, integers or elements are mentioned which have known obvious or foreseeable equivalents, then such equivalents are herein incorporated as if individually set forth. Reference should be made to the claims for determining the true scope of the present disclosure, which should be construed as to encompass any such equivalents. It will also be appreciated by the reader that integers or features of the disclosure that are described as advantageous, convenient or the like are optional, and do not limit the scope of the independent claims. Moreover, it is to be understood that such optional integers or features, whilst of possible benefit in some embodiments of the disclosure, may not be desirable and may therefore be absent in other embodiments.

The invention claimed is:

1. A contact lens for use in preventing or slowing the development or progression of myopia, the lens including an optic zone and a peripheral zone surrounding the optic zone, the optic zone comprising:
   a central region, the central region having a first optical axis and a curvature providing a base power and centred on a centre of curvature that is on the first optical axis; and
   an annular region, wherein the annular region circumferentially surrounds the central region, and wherein the annular region comprises a treatment zone having a characteristic that reduces the contrast of an image of an object that is formed by light passing through the central region and the treatment zone compared to an image of an object that would be formed by light passing through only the central region, the treatment zone comprising an add-power region having a curvature providing an add-power of 0.5 D or more, wherein the characteristic that causes the contrast reduction varies with meridian around the annular region, and
   wherein the peripheral zone has a constant thickness profile in every meridian or a variation in thickness configured to promote rotation of the lens.

2. The contact lens according to claim 1, wherein the peripheral zone has a variation in thickness configured to promote rotation of the lens, and wherein the thickness profile of the peripheral zone has no axis of mirror symmetry.

3. The contact lens according to claim 1, wherein the peripheral zone has a variation in thickness configured to promote rotation of the lens, and wherein the thickness of the peripheral zone is constant on one half of the lens and varies on the other half of the lens.

4. The contact lens according to claim 3, in which the variation on the other half of the lens provides a prism ballast on that half of the lens.

5. The contact lens according to claim 1, wherein the peripheral zone has a variation in thickness configured to promote rotation of the lens, and wherein the thickness of the peripheral zone varies periodically around the lens.

6. The contact lens according to claim 5, in which the periodic variation is a sinusoid, triangular or sawtooth waveform.

7. The contact lens according to claim 1, wherein the annular region comprises a plurality treatment zones separated by regions that do not substantially reduce the contrast of an image of an object that is viewed through the annular region compared to an image of an object that is viewed through the central region.

8. The contact lens according to claim 7, wherein the treatment zones are arranged at regular intervals around the circumference of the annular region.

9. The contact lens according to claim 1, wherein the treatment zone comprises a strong contrast reduction region having a characteristic that reduces the contrast of an image of an object that is viewed through the treatment zone compared to an image of an object that is viewed through the central region by 50% or more, wherein the area of the strong contrast reduction region is less than 50% of the area of the annular region.

10. The contact lens according to claim 8, wherein the treatment zone further comprises a weaker contrasting reduction region having a characteristic that reduces the contrast of an image of an object that is viewed through the treatment zone compared to an image of an object that is viewed through the central region between 10% and 50%.

11. The contact lens according to claim 1, wherein the add-power region has a curvature providing a max add power of at least 2.0 D, and wherein treatment zone further comprises a lower add power region having a curvature providing a low add-power of between 0 D and 1.5 D.

12. The contact lens according to claim 1, wherein the annular region comprises at least one base-power region, having the curvature providing the base power and centred on the centre of curvature of the central region.

13. The contact lens according to claim 1, wherein the curvatures are curvatures of the anterior surface of the lens.

14. The contact lens according to claim 1, wherein the treatment zone includes a feature that increases scattering of light passing through the treatment zone compared to light passing through the central region.

15. The contact lens according to claim 14, wherein the feature is disposed on an anterior surface of the annular region.

16. The contact lens according to claim 1, wherein the treatment zone has a characteristic that causes diffraction of light passing through the treatment zone.

17. The contact lens according to claim 1, wherein the central region is substantially circular in shape and has a diameter of between 2 and 7 mm.

18. The contact lens according to claim 1, wherein the annular region extends radially outwards from a perimeter of the central region by between 0.5 and 1.5 mm.

19. The contact lens according to claim 1, wherein the base power is between 0.5 D and −15.0 D.

20. The contact lens according to claim 1, wherein the lens comprises an elastomer material, a silicone elastomer material, a hydrogel material, or a silicone hydrogel material, or mixtures thereof.

21. The contact lens according to claim 1, wherein the lens is formed using a lathing process.

22. A method of manufacturing a contact lens, the method comprising:
- forming a contact lens, the lens including an optic zone and a peripheral zone surrounding the optic zone, the optic zone comprising:
- a central region, the central region having a first optical axis and a curvature providing a base power and centred on a centre of curvature that is on the first optical axis; and
- an annular region, wherein the annular region circumferentially surrounds the central region, and wherein the annular region comprises a treatment zone having a characteristic that reduces the contrast of an image of an object that is viewed through the treatment zone compared to an image of an object that is viewed through the central region, the treatment zone comprising an add-power region having a curvature providing an add-power of 0.5 D or more, wherein the characteristic that causes the contrast reduction varies with meridian around the annular region,
- and wherein the peripheral zone has a constant thickness profile in every meridian or a variation in thickness configured to promote rotation of the lens.

23. A method of reducing progression of myopia, comprising:
- providing the contact lens according to claim 1 to a myopic person who is able to accommodate for varying near distances.

* * * * *